(12) United States Patent
Matsuyama

(10) Patent No.: US 11,210,763 B2
(45) Date of Patent: Dec. 28, 2021

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Kazunori Matsuyama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/990,514

(22) Filed: Aug. 11, 2020

(65) Prior Publication Data

US 2021/0049732 A1 Feb. 18, 2021

(30) Foreign Application Priority Data

Aug. 14, 2019 (JP) ............................... JP2019-148817

(51) Int. Cl.
*G06T 1/60* (2006.01)
*G06T 1/20* (2006.01)

(52) U.S. Cl.
CPC ............... *G06T 1/60* (2013.01); *G06T 1/20* (2013.01); *G06T 2200/28* (2013.01)

(58) Field of Classification Search
CPC .......... G06T 1/60; G06T 1/20; G06T 2200/28
See application file for complete search history.

(56) References Cited

U.S. PATENT DOCUMENTS

| 7,075,541 | B2* | 7/2006 | Diard | G06T 15/005 |
| | | | | 345/502 |
| 7,633,505 | B1* | 12/2009 | Kelleher | G06T 1/20 |
| | | | | 345/502 |
| 8,754,894 | B2* | 6/2014 | Bakalash | G06T 1/20 |
| | | | | 345/505 |
| 2005/0281482 | A1* | 12/2005 | Nishiyama | H04N 1/6011 |
| | | | | 382/282 |
| 2017/0155593 | A1* | 6/2017 | Hirata | H04L 43/0894 |
| 2018/0315157 | A1* | 11/2018 | Ould-Ahmed-Vall | |
| | | | | G06N 3/084 |
| 2020/0244875 | A1* | 7/2020 | Lee | H04N 5/23229 |

FOREIGN PATENT DOCUMENTS

| JP | 2009-171183 A | 7/2009 | |
| JP | 2009171183 A | * 7/2009 | ............... G09G 3/20 |

* cited by examiner

*Primary Examiner* — Jennifer Mehmood
*Assistant Examiner* — Donna J. Ricks
(74) *Attorney, Agent, or Firm* — Carter, DeLuca & Farrell LLP

(57) ABSTRACT

An image processing apparatus of the technique of this disclosure includes processing units, storage units, a control unit, dividing units which divide image data, and combining units which combine image data. The control unit specifies processing for which image data is divided according to a status of use of the storage units. The control unit causes one of the image processing units to process one of parts of image data divided based on a dividing position, combines the processed part of image data with the other part of image data, causes the other of the image processing units to process the other of parts of image data, the other of parts of image data being not processed by the one of the image processing units, and combines the processed part of image data with the one part of image data.

20 Claims, 17 Drawing Sheets

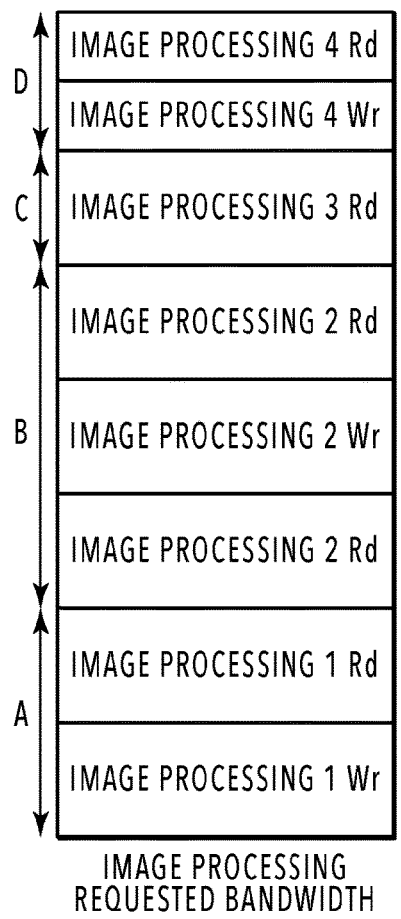
FIG.3A
IMAGE PROCESSING REQUESTED BANDWIDTH
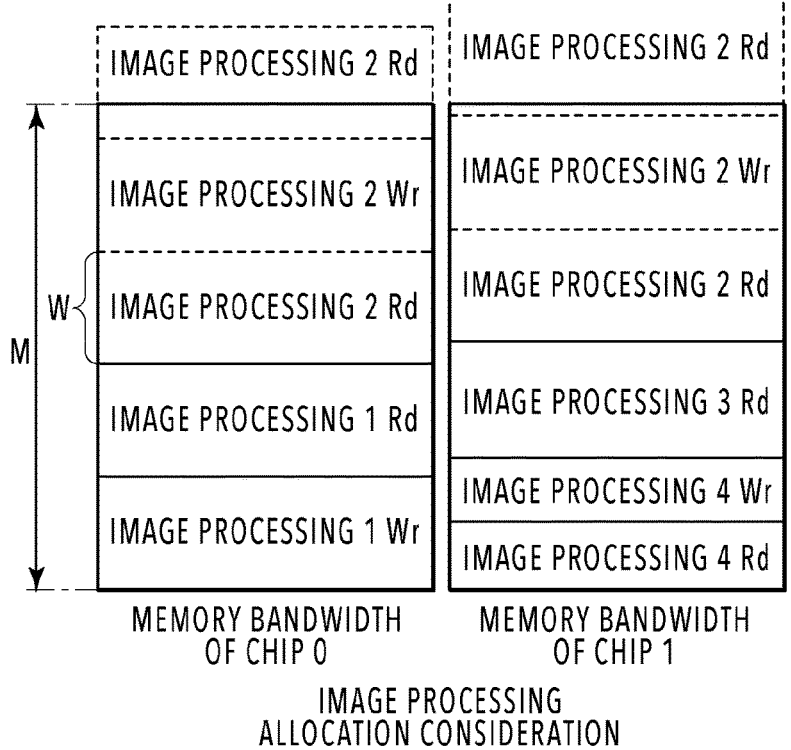
FIG.3B
IMAGE PROCESSING ALLOCATION CONSIDERATION
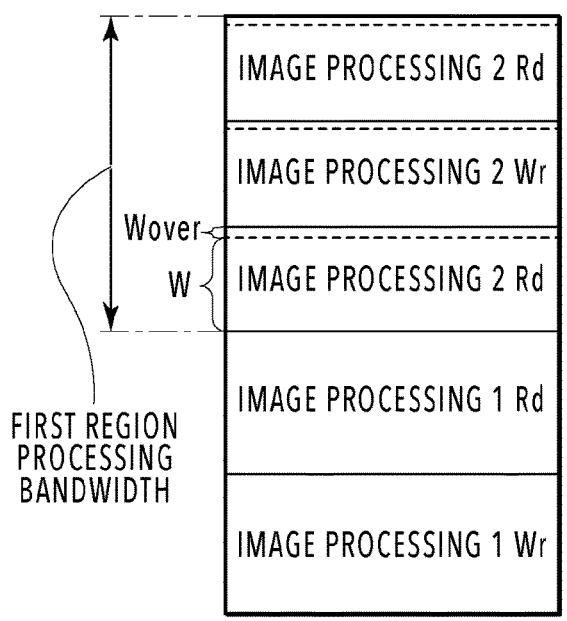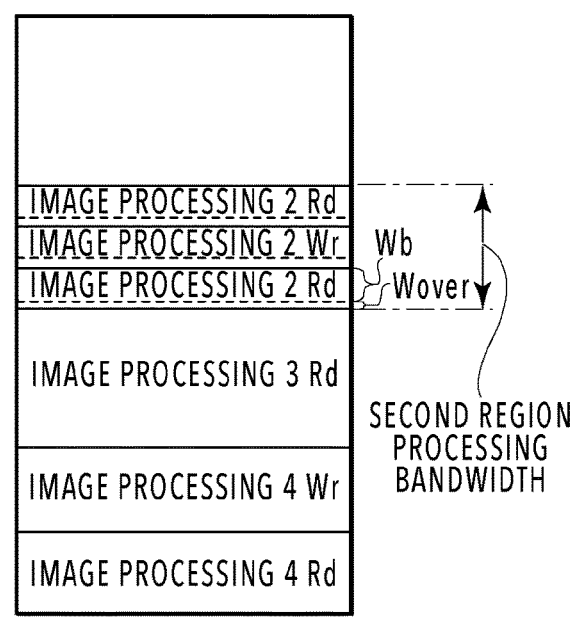
FIG.3C
IMAGE PROCESSING DIVISION RESULT

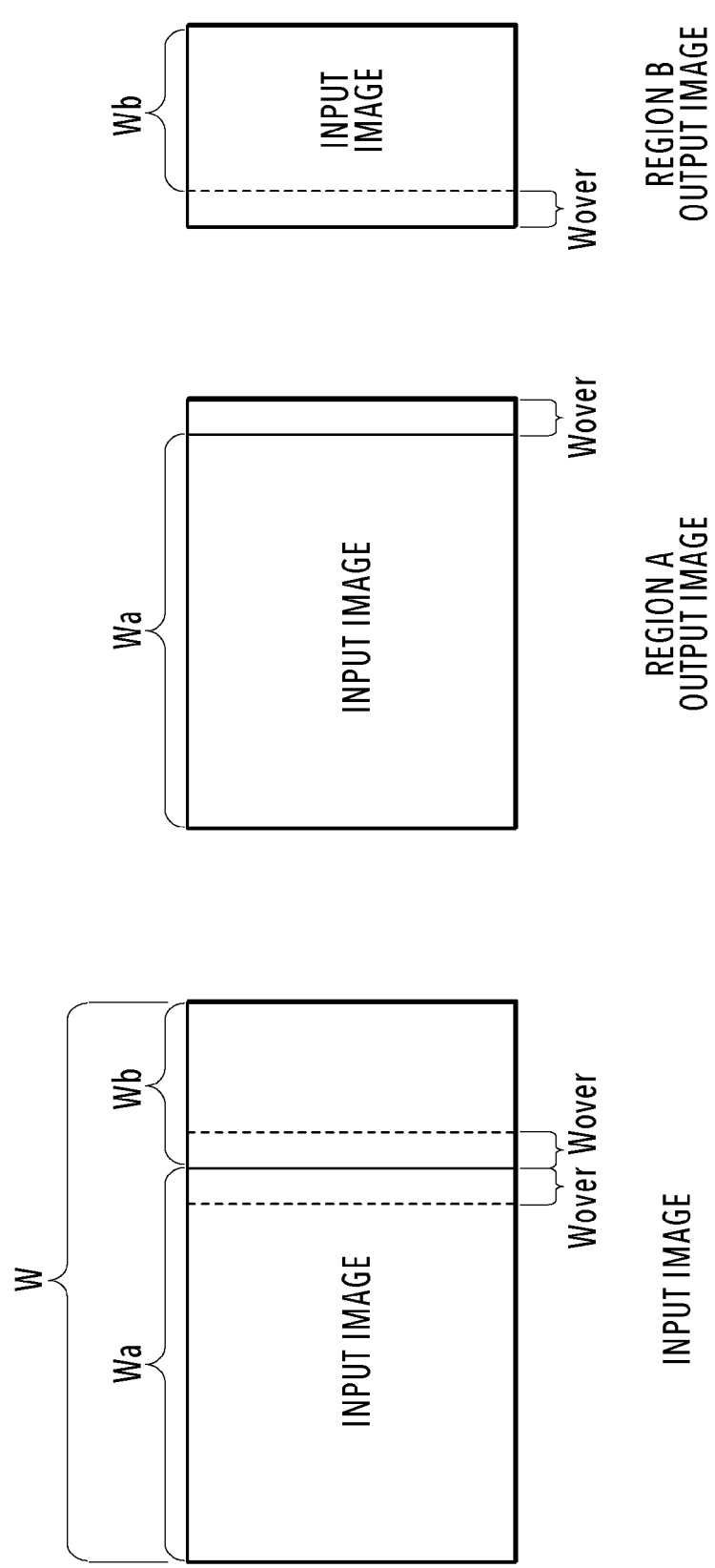

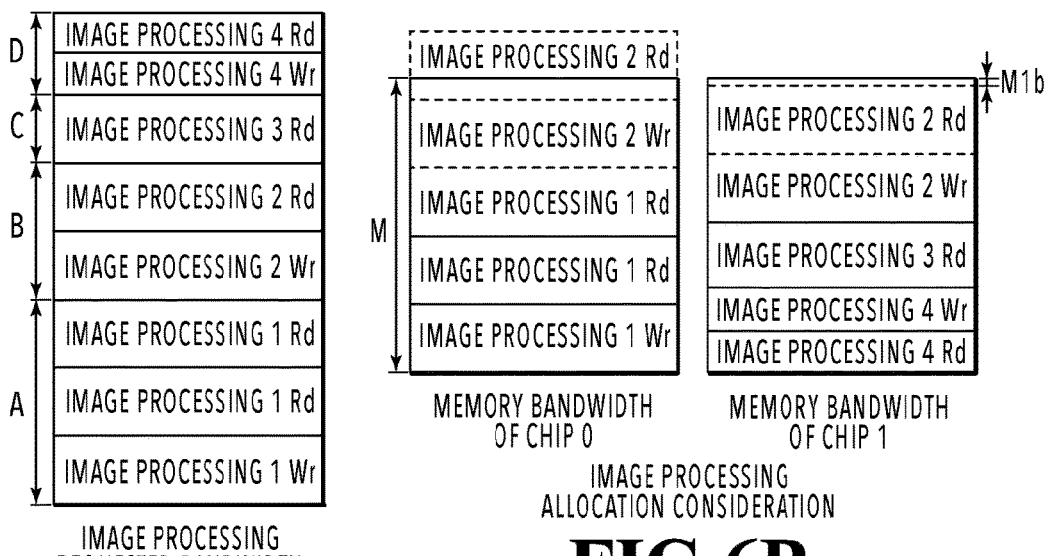
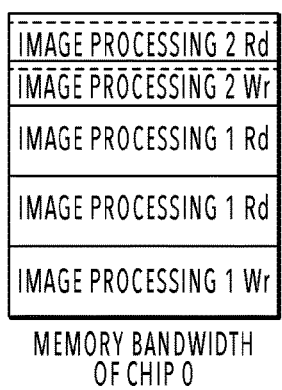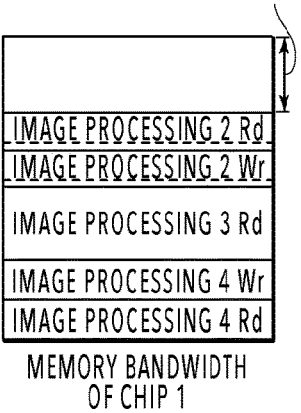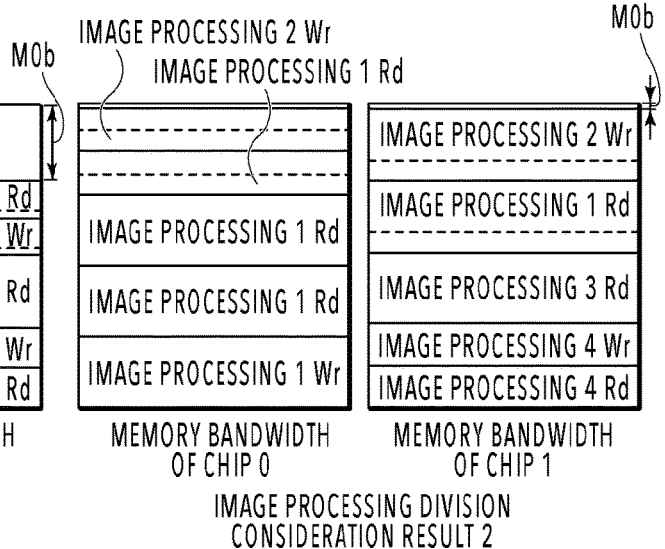
FIG.6A — IMAGE PROCESSING REQUESTED BANDWIDTH
FIG.6B — IMAGE PROCESSING ALLOCATION CONSIDERATION
FIG.6C — IMAGE PROCESSING DIVISION CONSIDERATION RESULT 1
FIG.6D — IMAGE PROCESSING DIVISION CONSIDERATION RESULT 2
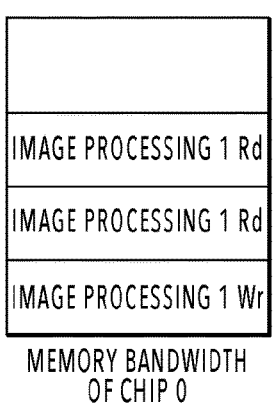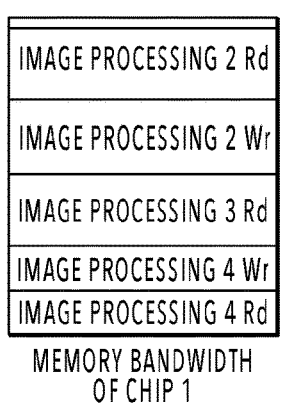
FIG.6E — IMAGE PROCESSING ALLOCATION RESULT SYNCHRONIZATION INFORMATION
IN INPUT OF DIVIDING UNIT 102a SYNCHRONIZATION INFORMATION
IN OUTPUT OF COMBINING UNIT 104a SYNCHRONIZATION INFORMATION
IN OUTPUT OF COMBINING UNIT 104b

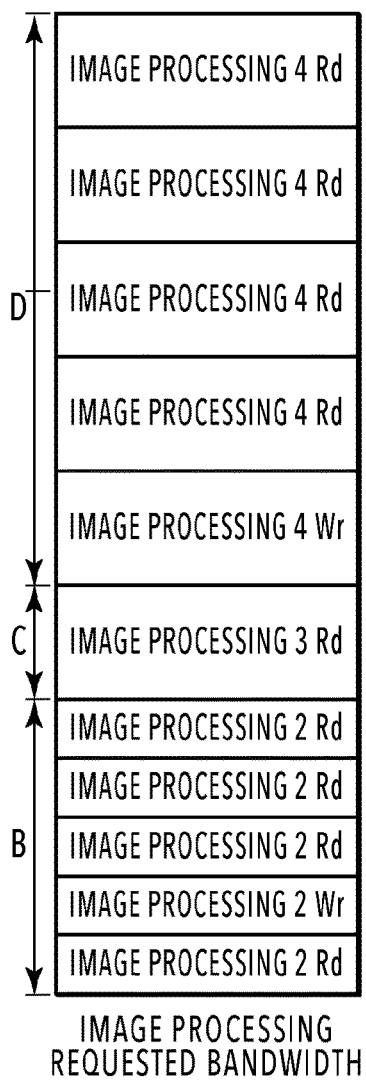
IMAGE PROCESSING
REQUESTED BANDWIDTH
FIG.10A
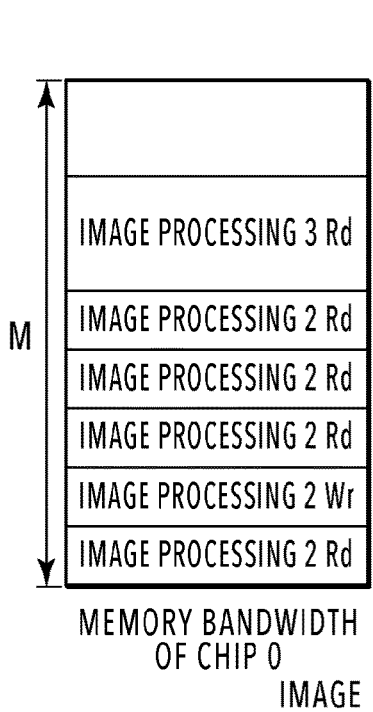
MEMORY BANDWIDTH
OF CHIP 0
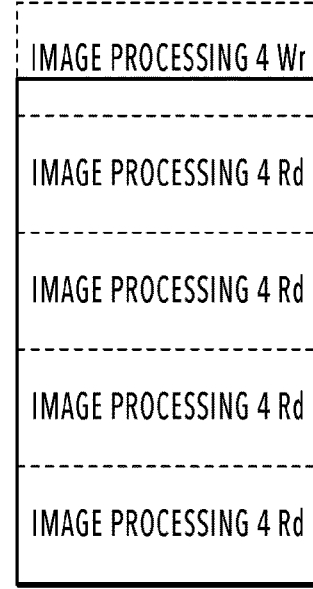
MEMORY BANDWIDTH
OF CHIP 1
IMAGE PROCESSING
ALLOCATION CONSIDERATION
FIG.10B
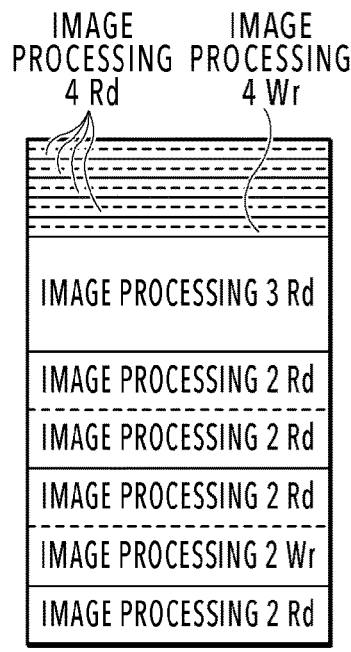
MEMORY BANDWIDTH
OF CHIP 0
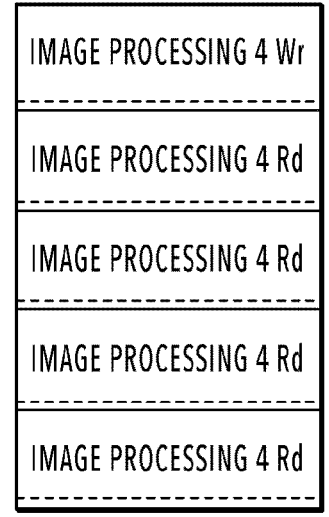
MEMORY BANDWIDTH
OF CHIP 1
IMAGE PROCESSING DIVISION RESULT
FIG.10C

IMAGE PROCESSING
REQUESTED BANDWIDTH

IMAGE PROCESSING
ALLOCATION CONSIDERATION

IMAGE PROCESSING DIVISION RESULT

OPERATION OF IMAGE PROCESSING APPARATUS IN TWO-SCREEN SYNTHESIS OPERATION

OPERATION OF IMAGE PROCESSING APPARATUS IN SINGLE INPUT PROCESSING

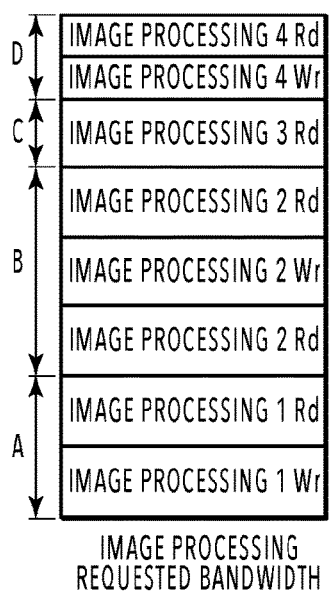
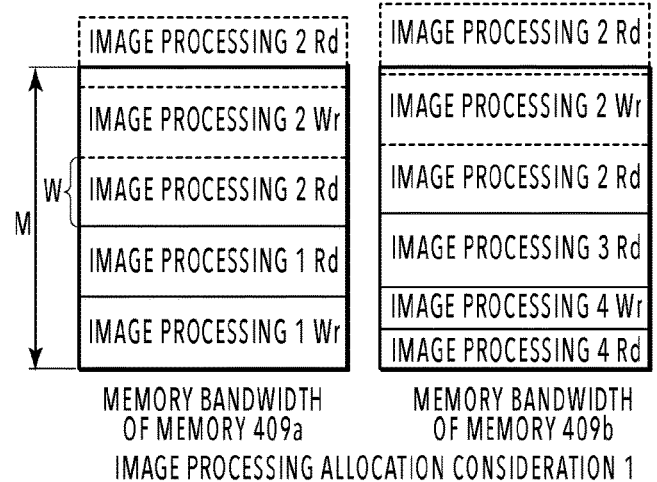
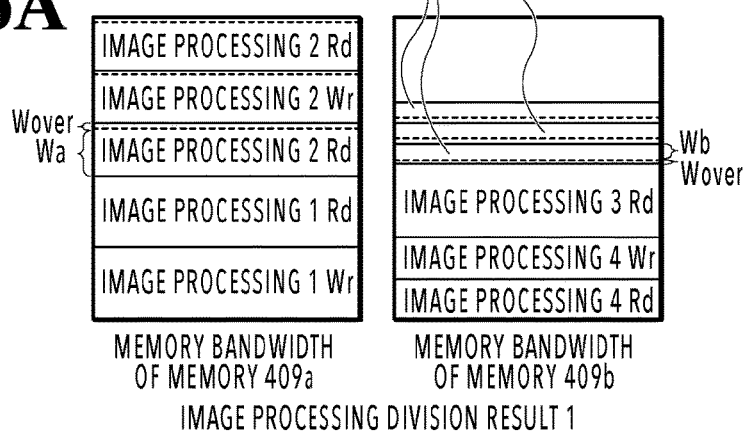
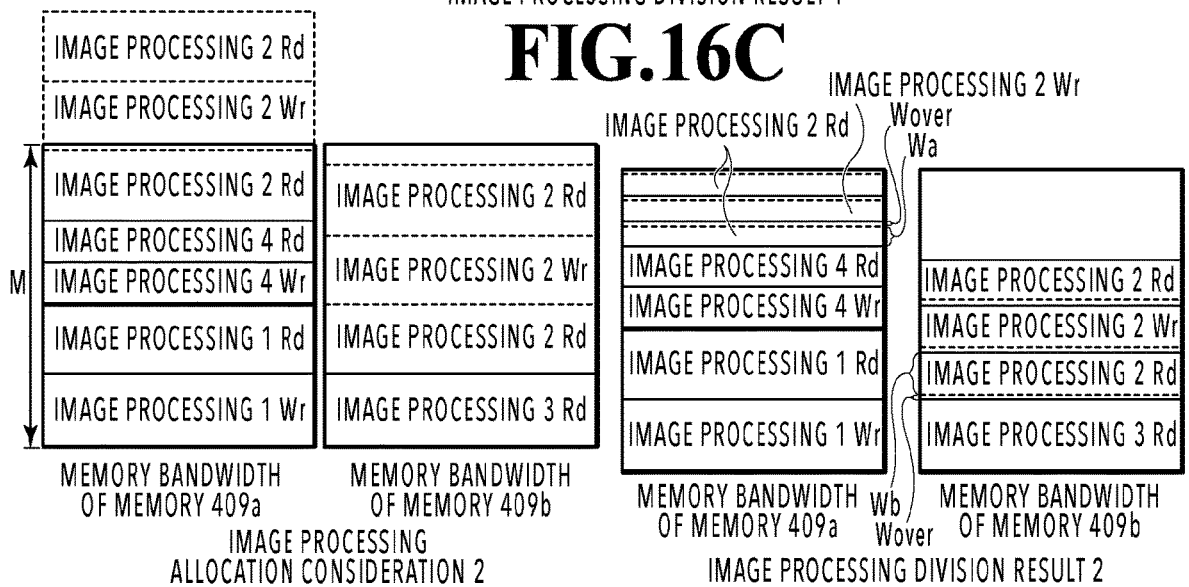
FIG.16A IMAGE PROCESSING REQUESTED BANDWIDTH
FIG.16B IMAGE PROCESSING ALLOCATION CONSIDERATION 1
FIG.16C IMAGE PROCESSING DIVISION RESULT 1
FIG.16D IMAGE PROCESSING ALLOCATION CONSIDERATION 2
FIG.16E IMAGE PROCESSING DIVISION RESULT 2

IMAGE PROCESSING APPARATUS, IMAGE PROCESSING METHOD, AND STORAGE MEDIUM

BACKGROUND OF THE INVENTION

Field of the Invention

The technique of this disclosure relates to a technique to suitably control a memory bandwidth.

Background Art

Recently, the progress of a large-scale integrated circuit (LSI) process is accompanied by an increase in degree of integration, which enables processing of a high resolution and high frame rate image using a single chip. However, high resolution and high frame rate image processing requires a number of memory accesses. Further, the growth of increase in speed of a memory such as a dynamic random access memory (DRAM) is slow as compared with the increase in degree of integration of LSI. Accordingly, depending on the restriction of a memory bandwidth, it is difficult to use all of the functions of image processing.

As a method of performing image processing while satisfying the restriction of a memory bandwidth, there is proposed a method of dividing and executing image processing by a plurality of chips. Japanese Patent Laid-Open No. 2009-171183 proposes a method of dividing an image into left and right images and processing them. In this method, since an image is divided into left and right images and processed, two LSI memory bandwidths are equally used, whereby a memory requested bandwidth per chip can be reduced by about half. However, in a case where a chip for processing a divided image is different from a chip for display, the processing becomes complicated since the one chip requires a divided image allocated to the other chip for image layout processing such as horizontal flip processing, rotation processing, and downsizing layout processing. Further, since dividing processing is performed while images partially overlap each other at a division boundary in each image processing, a memory bandwidth corresponding to the overlapping region is increased.

To deal with such a problem, there is proposed a method of dividing image processing into first and second halves, connecting chips for image processing in series, and executing the processing. In this method, since the processing is performed without spatial division of an image, the above-mentioned layout processing can be easily performed without the addition of a memory bandwidth corresponding to the overlapping region.

In the case of dividing image processing into first and second halves, however, a memory requested bandwidth of each of the first and second halves of the image processing needs to satisfy a memory bandwidth of each chip. Further, the image processing needs to be performed in a predetermined order and the memory requested bandwidths of each image processing are not uniform. Accordingly, even if the sum total of the memory requested bandwidths of the image processing satisfies a memory requested bandwidth of a system, it may be beyond a memory requested bandwidth of each chip. In addition, since a memory requested bandwidth of each image processing varies according to a change of settings of an input/output format and an image processing mode, it is not easy to perform control so as to fall within a memory requested bandwidth of each chip.

SUMMARY OF THE INVENTION

An image processing apparatus of the technique of this disclosure comprises: a plurality of image processing units configured to apply image processing according to the image processing units; a plurality of storage units used in the image processing; a control unit configured to control image processing; at least two dividing units configured to divide image data according to an instruction from the control unit; and at least two combining units configured to combine image data according to an instruction from the control unit, wherein the control unit specifies image processing for which image data is divided by each of the at least two dividing units according to information about a status of use of the storage units, the control unit determines a dividing position in which image data to be processed in the specified image processing is divided by each of the at least two dividing units, on a condition that the image processing units include at least two image processing units that apply the specified image processing and the at least two image processing units are connected to different ones of the storage units, the control unit performs control such that one of the at least two image processing units applies image processing to one of at least two parts of image data divided by one of the at least two dividing units based on the dividing position, and one of the at least two combining units combines the one of the at least two parts of image data subjected to the image processing by the one of the at least two image processing units with a different at least one of the at least two parts of image data, and the control unit performs control such that a different at least one of the at least two image processing units applies image processing to the different at least one of at least two parts of image data obtained by a different at least one of the at least two dividing units dividing the combined image data based on the dividing position, the different at least one of the at least two parts of image data being not subjected to the image processing by the one of the at least two image processing units, and a different at least one of the at least two combining units combines the different at least one of the at least two parts of image data subjected to the image processing by the different at least one of the at least two image processing units with the one of the at least two parts of image data.

Further features of the present invention will become apparent from the following description of exemplary embodiments with reference to the attached drawings.

BRIEF DESCRIPTION OF THE DRAWINGS

FIG. 3A is a diagram for explaining the allocation of memory bandwidths;

FIG. 3B is a diagram for explaining the allocation of memory bandwidths;

FIG. 3C is a diagram for explaining the allocation of memory bandwidths;

FIG. 4A is a diagram for explaining the division of an input image and an overlapping region;

FIG. 4B is a diagram for explaining the division of an input image and an overlapping region;

FIG. 4C is a diagram for explaining the division of an input image and an overlapping region;

FIG. 6A is a diagram for explaining the allocation of memory bandwidths;

FIG. 6B is a diagram for explaining the allocation of memory bandwidths;

FIG. 6C is a diagram for explaining the allocation of memory bandwidths;

FIG. 6D is a diagram for explaining the allocation of memory bandwidths;

FIG. 6E is a diagram for explaining the allocation of memory bandwidths;

FIG. 10A is a diagram for explaining the allocation of memory bandwidths;

FIG. 10B is a diagram for explaining the allocation of memory bandwidths;

FIG. 10C is a diagram for explaining the allocation of memory bandwidths;

FIG. 16A is a diagram for explaining the allocation of memory bandwidths;

FIG. 16B is a diagram for explaining the allocation of memory bandwidths;

FIG. 16C is a diagram for explaining the allocation of memory bandwidths;

FIG. 16D is a diagram for explaining the allocation of memory bandwidths; and

FIG. 16E is a diagram for explaining the allocation of memory bandwidths.

DESCRIPTION OF THE EMBODIMENTS

Figure 1:
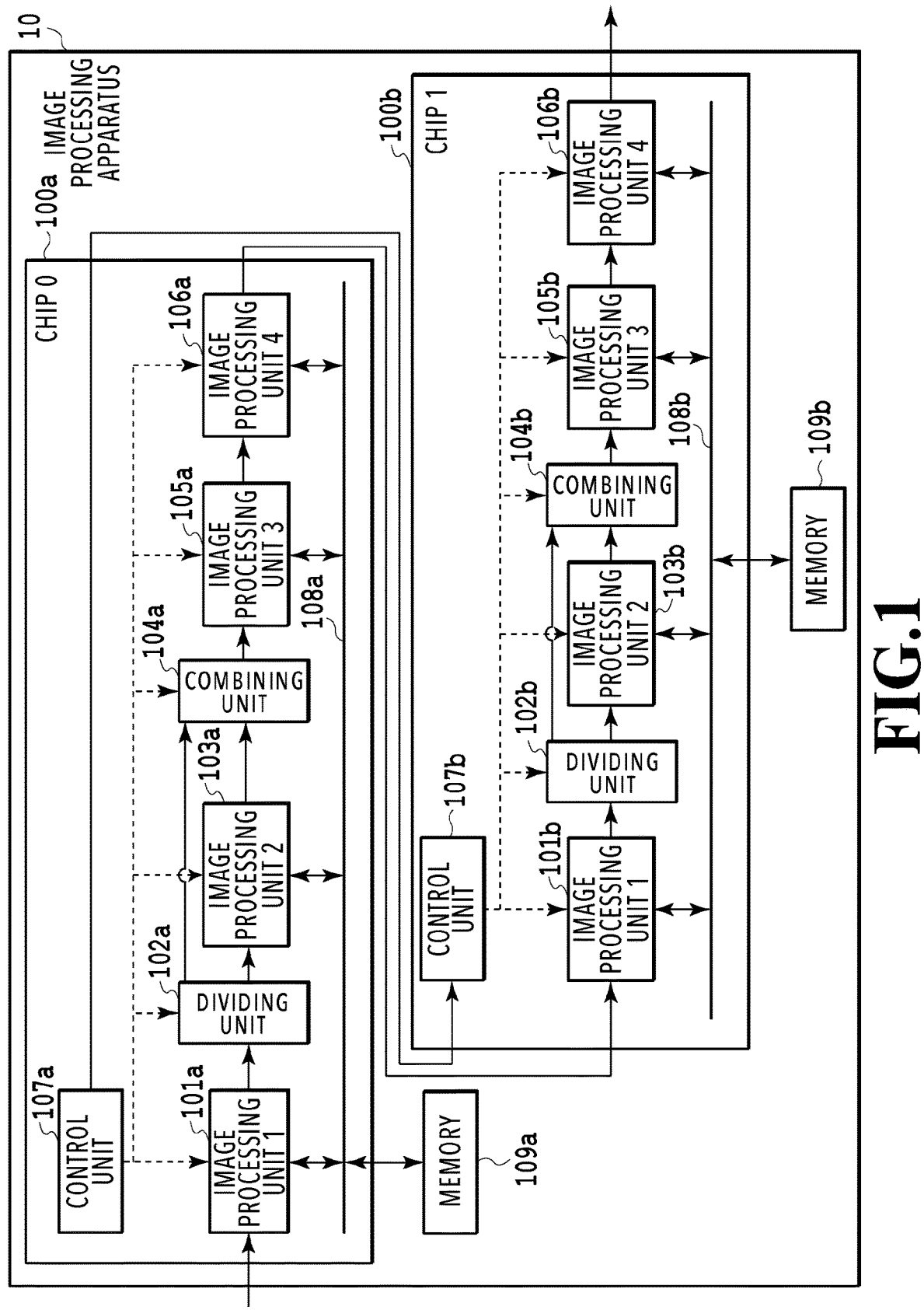
FIG. 1 is a block diagram showing the configuration of an image processing apparatus.

Embodiments of the technique of this disclosure will be described below with reference to the drawings. It should be noted that the embodiments described below do not limit the technique of the disclosure and that not all combinations of the features described in the embodiments are essential for solving the problem to be solved by the technique of the disclosure. In the following description, the same reference numerals are assigned to the same features.

First Embodiment

System Configuration and Processing

FIG. 1 is a block diagram showing the configuration of an image processing apparatus of the present embodiment. As shown in FIG. 1, an image processing apparatus 10 comprises two identical chips (a chip 0 100*a* and a chip 1 100*b*) and the output of the chip 0 100*a* and the input of the chip 1 100*b* are connected in series. In the following description, "a" in the end of the reference numeral assigned to a block indicates that the block belongs to "chip 0" and "b" in the end of the reference numeral indicates that the block belongs to "chip 1." A feature common to the chip 0 100*a* and the chip 1 100*b* will be described (explained) without assigning "a" or "b" in the end of the reference numeral.

Each of the chip 0 100*a* and the chip 1 100*b* comprises an image processing unit 1 101, an image processing unit 2 103, an image processing unit 3 105, and an image processing unit 4 106. Each image processing unit has a first image processing mode in which image processing is executed using information stored in a memory 109 and a second image processing mode in which an input image passes through without the execution of image processing. The image processing units 1 to 4 switch between the first image processing mode and the second image processing mode according to an instruction from a control unit 107.

The information stored in the memory 109 for use in the first image processing mode may be image information that the image processing unit writes to the memory 109 by itself or may be information written to the memory 109 by a different image processing unit. Each image processing unit can execute various types of processing such as IP conversion, three-dimensional noise reduction, synthesis processing, transformation processing, overdrive processing, encoding processing, decoding processing, and recognition processing using a deep learning method. It should be noted that the above-mentioned "different image processing unit" includes an unshown image processing unit and that the IP conversion stands for interlace progressive conversion.

In the present embodiment, each image processing unit executes a raster scan for an input image (that is, an input image is horizontally scanned from upper left to lower right). However, the specification of processing (unit of processing) is not necessarily limited to this. For example, the unit of processing may be a block image obtained by dividing an input image into rectangles including an overlapping region between adjacent regions, or may be an image obtained by vertically or horizontally dividing an input image into strips.

The first image processing mode may further comprise a plurality of image processing settings. For example, it is possible to comprise a plurality of image processing settings different in number of frames to be read as a reference image from the memory 109. In addition, in the case of setting the second image processing mode, an unnecessary computation unit (that operates in passing through setting) may be powered off in order to reduce power consumption of the processing.

A dividing unit 102 divides an input image according to an instruction from the control unit 107 and outputs the divided images to the image processing unit 2 103 or a combining unit 104. In the execution of image processing for the divided images in the image processing unit 2 103, the image processing unit 2 103 refers to an image (set of pixels) around a division boundary by filtering processing or the like. Therefore, the dividing unit 102 adds an overlap region at the time of division so as to make the division boundary invisible. The dividing unit 102 acquires information about the dividing position and the overlap region from the control unit 107.

In the chip 0 100a, a region divided by the dividing unit 102a and output by the image processing unit 2 103a is defined as a first region and a region output by the dividing unit 102a is defined as a second region. In this case, contrary to the dividing unit 102a, the dividing unit 102b of the chip 1 100b outputs the processed first region to the combining unit 104b and outputs the unprocessed second region to the image processing unit 2 103b. This enables execution of image processing 2 for each of the divided images.

In the present embodiment, since memory bandwidths are distributed based on the premise that a raster scan is executed as image processing, an input image is horizontally divided. However, the embodiment is not limited to this. For example, at the time of inputting block images, each block image may be allocated to a first or second region according to a predetermined ratio without dividing the block image. In a case where the control unit 107 sets the first and second regions in a ratio of 3:2, the input block images are sequentially set as regions 1, 1, 2, 1, 1, 2 . . . in a balanced manner, whereby memory bandwidths can be uniformly allocated without temporal concentration in image processing of the first and second regions.

The combining unit 104 combines an image output from the image processing unit 2 103 with an image output from the dividing unit 102 according to an instruction from the control unit 107. In the present embodiment, since a raster scan is executed as image processing, control is performed such that the output result of the dividing unit 102 is output in the first half of one line period and the output result of the image processing unit 2 103 is output in the second half of one line period. However, the control is not necessarily limited to this. In the output result of the image processing unit 2 103, an overlap region unnecessary for the subsequent processing is deleted in the image processing unit 2 103 or the combining unit 104.

The control unit 107 includes a central processing unit (CPU) and controls each block in a chip according to a processing flow (control flow) or the like described later. The control unit 107a and the control unit 107b are connected so as to communicate with each other. The control unit 107a can control each block in the chip 1 100b by controlling the control unit 107b. The control unit 107 of each chip is connected in conformity with various standards such as Peripheral Component Interconnect (PCI). The control relationship between the control unit 107a and the control unit 107b may be reversed such that the control unit 107b controls the control unit 107a.

The memory 109 is connected to the image processing units 1 to 4 via a bus 108 in a chip and is mounted for each chip. Accordingly, the image processing unit 2 103a and the image processing unit 2 103b are connected to different memories 109a and 109b, respectively. The memory 109 is configured using, for example, Double-Data-Rate4 Synchronous Dynamic Random Access Memory (DDR4 SDRAM). The memories 109a and 109b may be configured using identical memories or memories different in operating frequency or capacity. Accessories such as a memory controller controlling the memory 109 may be well-known ones and the description thereof is omitted.

Procedure of Image Processing

Next, the processing in the control unit 107a of the image processing apparatus 10 of the present embodiment will be described with reference to a flowchart shown in FIG. 2. In the description of the flowchart, sign "S" represents a step.

If the control unit 107a determines an input format to the image processing apparatus 10 in S1, the control unit 107a determines in S2 an image processing mode executed in the image processing apparatus 10. The image processing mode designates the content of each image processing, for example, according to user settings.

If image processing executed in the image processing apparatus 10 is determined in S1 and S2, memory bandwidths necessary for image processing 1 to 4 are calculated in S3 based on the information determined in S1 and S2.

A memory bandwidth necessary for each image processing can be calculated from the amount of data concerning writing and reading of image processing, a restriction period of writing and reading that can establish the processing, and the like. For example, a memory bandwidth necessary for a memory access of image data is calculated from an image size of the image data, a bit depth of each pixel, an image processing mode, and the like as the amount of data, and a frame rate, a restriction period based on the amount of buffer of the image processing, and the like as the restriction period. In addition, for example, in the case of a memory access concerning image data that is not directly relevant to an image such as motion information, a necessary memory bandwidth is calculated from the amounts of data written and read during a predetermined period of the image processing.

A supplemental explanation will be given of the memory bandwidths and their allocation with reference to FIG. 3A to FIG. 3C. To simplify the explanation, the memory bandwidths necessary for image processing 1 to 4 are indicated by A to D and a memory bandwidth available in the image processing of each chip is indicated by M.

The image processing 1 to 4 will be described below. In the present embodiment, an input image means an image input to each block (such as the image processing unit). The same applies hereinafter.

The image processing 1 is processing of temporarily writing an input image to the memory 109, reading the written image, executing predetermined processing, and outputting the processing result. The image processing 2 is processing of reading an image written to the memory 109, applying processing to the read image, writing the processing result to the memory 109, reading the written image, executing predetermined processing, and outputting the image. The image processing 3 is processing of reading a processing result by an unshown processing unit stored in the memory 109, executing predetermined image processing for an input image, and outputting the image. The image processing 4 is processing of extracting data from an input image, writing the extracted data to the memory 109, reading the data stored in the memory 109, and executing predetermined image processing for the next frame. In view of the above, a memory bandwidth necessary for each image processing in the image processing apparatus 10 is as shown in FIG. 3A.

Returning to FIG. 2, in S4, the control unit 107a allocates the execution of each of the image processing 1 to 4 to either the chip 0 100a or chip 1 100b. Regarding the order of the image processing, the image processing needs to be continuously executed in the order of 1, 2, 3, and 4. Thus, the control unit 107a allocates the image processing in normal order from the image processing 1 in the chip 0 100a and allocates the image processing in reverse order from the image processing 4 in the chip 1 100b. In a case where the image processing is allocated in this order to satisfy the memory bandwidth of each chip, the allocation is as shown in FIG. 3B. That is, a memory used in the image processing 1 is allocated to the memory 109a of the chip 0 100a and a memory used in the image processing 3 and 4 is allocated to the memory 109b of the chip 1 100b.

Next, a memory bandwidth allocated to the image processing 2 is considered. As described above, the image processing unit 2 refers to a frame image stored in the memory 109, executes processing, writes the processing result to the memory 109, reads the processing result from the memory 109, executes predetermined processing, and outputs the result. Accordingly, for example, writing corresponding to one frame and reading corresponding to two frames of an image in the image processing unit 2 103a should be executed in the memory 109a. Writing corresponding to one frame and reading corresponding to two frames of an image in the image processing unit 2 103b should be executed in the memory 109b. In short, the image processing unit 2 103 should execute writing corresponding to one frame and reading corresponding to two frames of an image using the memory 109 usable by itself.

Based on the above premise, even if an entire memory bandwidth necessary for the image processing 2 is allocated to either of the memories, a free memory bandwidth is insufficient as shown by the dashed lines in FIG. 3B due to the restriction of the memory bandwidths of the memories 109 of the present embodiment. Therefore, the control unit 107a executes the subsequent processing in S5 and S6.

In S5, the control unit 107a calculates a free memory bandwidth for allocation of a memory used for the image processing 2. The free memory bandwidth is represented by the total of a free memory bandwidth of the chip 0 100a (M−A) and a free memory bandwidth of the chip 1 100b (M−(C+D)).

In S6, since the image processing 2 is boundary processing in allocation of a memory bandwidth as shown in FIG. 3B, the control unit 107a specifies the image processing 2 as a target of dividing processing.

In S7, the control unit 107a determines whether the processing to be divided by a division boundary specified in S6 can be executed (divided) by the dividing unit 102. In the present embodiment, the control unit 107a determines whether the processing to be divided by a division boundary can be executed (divided) by the dividing unit 102 based on the configurations of the preceding stage and subsequent stage of the image processing unit as a target of dividing processing. More specifically, in the present embodiment, since the dividing unit 102 is mounted in the preceding stage of the image processing unit 2 and the combining unit 104 is mounted in the subsequent stage of the image processing unit 2 as shown in FIG. 1, the control unit 107a determines that the processing in the image processing 2 can be divided and moves the processing to S8. In a case where the dividing unit 102 and the combining unit 104 are not mounted, the control unit 107a moves (transitions) the processing to determination processing in S10.

If it is determined in S7 that the image processing specified in S5 can be divided, the control unit 107a determines in S8 whether the sum total of free bandwidths of the memories calculated in S5 is equal to or greater than a memory requested bandwidth used for processing in the case of dividing the image processing specified in S6. A memory bandwidth used in the case of dividing the image processing 2 is greater than that in the case of not dividing the image processing 2 since a memory bandwidth corresponding to an overlap region is added after the division.

As shown in FIG. 4A to FIG. 4C, in a case where an input image width is defined as W and an overlap region used in the image processing 2 is defined as Wover, a consumed memory bandwidth of the image processing 2 is represented by (1+2Wover/W)B. The sum total of the free memory bandwidths is represented by 2 M−(A+C+D). In this case, if the consumed memory bandwidth of the image processing 2 ((1+2Wover/W)B) is less than the sum total of the free memory bandwidths (2 M−(A+C+D)), the control unit 107a moves the processing to S9. Since the image processing 2 cannot be divided and executed if the consumed memory bandwidth of the image processing 2 ((1+2Wover/W)B) is greater than the sum total of the free memory bandwidths (2 M−(A+C+D)), the processing proceeds to S2 to reset the image processing mode.

In S9, the control unit 107a determines a dividing position of the image processing 2. As shown in FIG. 4A to FIG. 4C, a processing region width of the image processing unit 2 103a in the chip 0 is defined as Wa and a processing region width of the image processing unit 2 103b in the chip 1 is defined as Wb. In this case, as the processing of the image processing unit 2, the image processing unit 2 103a executes image processing for an image of a width Wa+Wover and the image processing unit 2 103b executes image processing for an image of a width Wb+Wover. Since a memory bandwidth necessary for executing the image processing 2 for an image of a width W is B, a memory bandwidth of (1+2Wover/W)B is necessary in the case of dividing the image processing 2 as described above.

In the present embodiment, in determination of a dividing position, the memory bandwidth of the chip 1 100b for executing the image processing 3 is freed as much as possible in order to improve the processing performance of the image processing 3. In other words, a dividing position is controlled (determined) so as to use up the free memory bandwidth of the chip 0 100a. In order to use up the memory bandwidth of the chip 0 100a, Wa is defined and a dividing position is specified (determined) such that a processing bandwidth of the image processing unit 2 103a is equal to the free memory bandwidth of the chip 0 100a, that is, (Wa+Wover)B/W=M−A. More preferably, Wa may be defined in consideration of alignment at the time of memory transfer of the image of the width Wa+Wover. Although the dividing position is controlled so as to use up the free memory bandwidth of the chip 0 100a for example, the processing performance of the image processing 3 can be improved also by making the free memory bandwidth of the chip 0 100a smaller than the free memory bandwidth of the chip 1 100b.

The image width Wb processed by the image processing unit 2 103b is calculated by W−Wa. The memory bandwidth necessary for the image processing 2 of the image processing unit 2 103b is (a requested bandwidth of the image processing 2 at the time of division)−(a processing bandwidth of the image processing unit 2 103a), that is, (1+2Wover/W)B−(M−A). If S9 is executed, a memory bandwidth used in each chip is as shown in FIG. 3C.

In S10, the control unit 107a determines whether the memory bandwidth of each chip will collapse. As a result of determination, if the memory bandwidth in use of each chip is less than the available memory bandwidth M as shown in FIG. 3C, the processing shown in FIG. 2 is finished.

Figure 2:
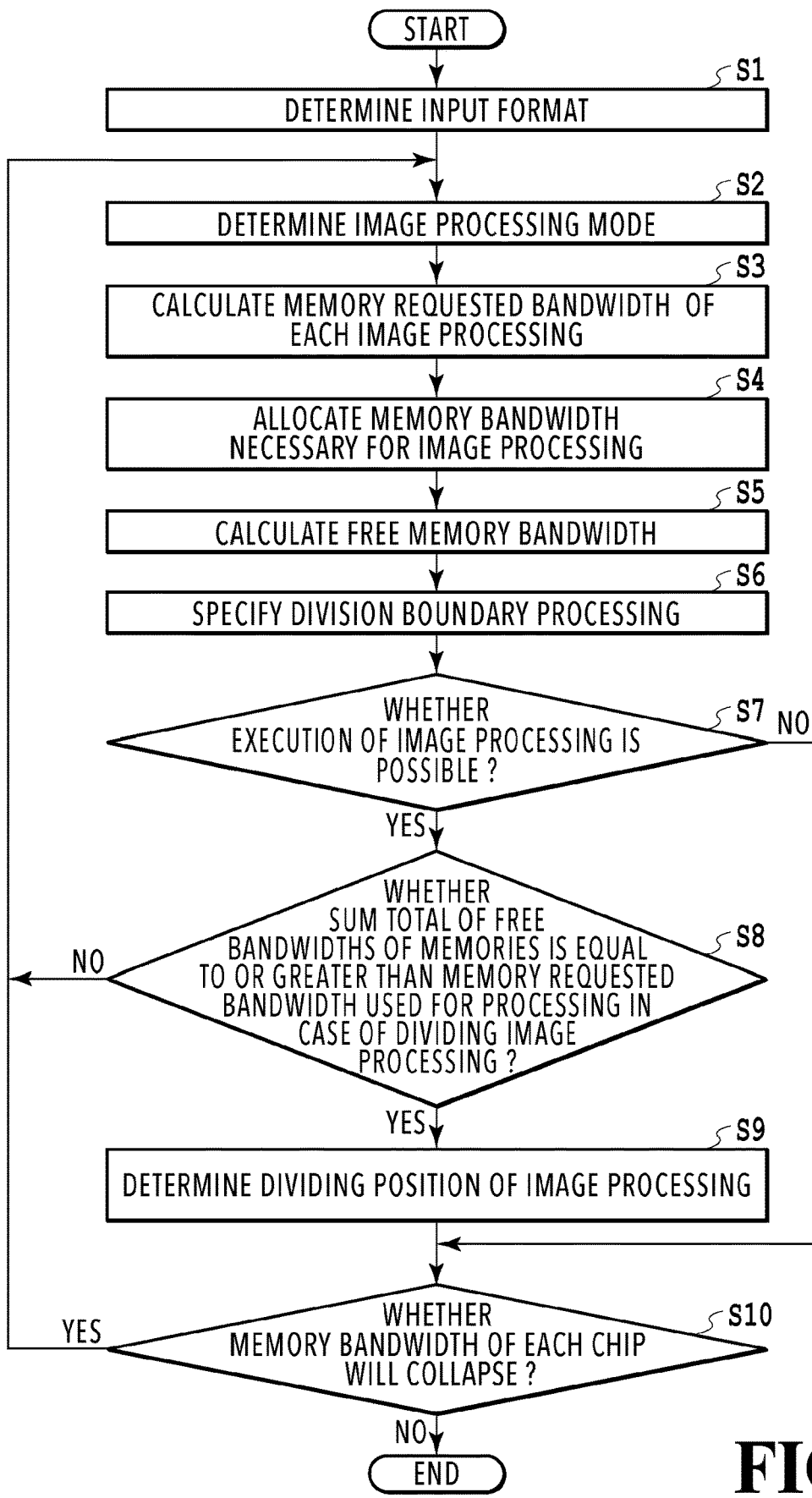
FIG. 2 is a flowchart showing the procedure of processing in a control unit of the image processing apparatus.
Figure 5:
FIG. 5 is a diagram showing a processing execution position and a processing range for each image processing.

As a result of the processing shown in FIG. 2, FIG. 5 shows an image region to be processed by each image processing unit and the order of processing. As shown in FIG. 5, in the chip 0 100a, control is performed such that the image processing 1 is executed for an entire image, the image processing 2 is executed for an image region of an image width Wa, the image processing 2 is not executed for an image region of an image width Wb, the image processing 3, and the image processing 4 are not executed, and the image is output. In the chip 1 100b, control is performed such that the image processing 1 is not executed and the image processing 2 is not executed for the image region of the image width Wa but is executed for the image region of the image width Wb, the image processing 3 and the image processing 4 are executed for the entire image, and the image is output. Information about the dividing position Wa and the overlap region Wover is transferred to the dividing unit 102 and the combining unit 104 as control information.

In the above description of the dividing processing, the memory bandwidth necessary for the image processing 2 is not within the memory bandwidth of the chip 0 or 1. A supplemental explanation will be given of processing in a case where the processing in the image processing 2 can fall within the memory bandwidth of the chip 1 with reference to FIG. 6A to FIG. 6E. More specifically, with reference to FIG. 6A to FIG. 6E, a description will be given of processing in a case where the memory bandwidth necessary for the image processing 2 falls within the memory bandwidth of the chip 1 and the chip 0 has a free memory bandwidth along with a change of the image processing setting or input format. As described above, the memory bandwidths are controlled such that the memory bandwidth of the chip 0 100a is used as much as possible and the memory bandwidth of the chip 1 100b is freed in order to improve the processing performance of the image processing 3. Thus, the processing shown in FIG. 2 is executed as described below.

First, as a result of considering the allocation of the image processing based on the memory bandwidth necessary for each image processing shown in FIG. 6A in S4 of FIG. 2, it is determined that the image processing 1 is executed in the chip 0 and the image processing 3 and the image processing 4 are executed in the chip 1 as shown in FIG. 6B. As described above, it is assumed that the memory bandwidth necessary for the image processing 2 cannot be within the free memory bandwidth of the memory 109a of the chip 0 100a but can be within the memory bandwidth of the chip 1 100b.

In S5, the control unit 107a calculates the free memory bandwidth of each chip. On the assumption that the free memory bandwidth of the chip 1 100b in a case where the memory bandwidths necessary for the image processing 2, 3, and 4 are set for the chip 1 is M1b, M1b=M−(B+C+D). In this case, however, the free memory bandwidth of the chip 1 (M1b) is small. That is, a memory bandwidth available for rendering processing of the image processing 3 is small, which reduces the rendering performance Therefore, in this case, in the processing subsequent to S6, maximization of the free memory bandwidth of the chip 1 100b is considered. That is, if the free memory bandwidth of the chip 1 100b (M1b) is less than a predetermined threshold, the control unit 107a maximizes the free memory bandwidth of the chip 1 100b.

In S6, the control unit 107a specifies the image processing 2 as a target of dividing processing. In S7, on the condition that the dividing unit 102 is mounted in the preceding stage of the image processing unit 2 and the combining unit 104 is mounted in the subsequent stage of the image processing unit 2, the control unit 107a determines that the processing in the image processing 2 can be divided and moves the processing to S8.

In S8, the sum total of the free memory bandwidths of the memories 109 excluding the memory bandwidth necessary for the image processing 2 and a memory requested bandwidth used for processing in the case of dividing the image processing 2 are calculated. The sum total of the free memory bandwidths of the memories 109 is the sum total of M−A of the memory 109a and M−(C+D) of the memory 109b. The memory requested bandwidth used for processing in the case of dividing the image processing 2 is (1+2Wover/W)B. Here, the processing proceeds to S9 based on the assumption that the memory requested bandwidth used for processing in the case of dividing the image processing 2 is equal to or less than the sum total of the free memory bandwidths of the memories 109.

In S9, the control unit 107a determines the dividing position of the image processing 2. On the assumption that the free memory bandwidth of the chip 1 100b after specifying the dividing position is M0b, if M0b>M1b (FIG. 6C), the control unit 107a adopts the dividing result in S9 and notifies each image processing unit of the processing result. On the other hand, there is a case where the free memory bandwidth of the chip 1 100b before division is larger, for example, due to an increase in memory bandwidth corresponding to a large overlap region necessary for the image processing 2. That is, if M0b<M1b (FIG. 6D), each image processing unit is notified of the processing (control) result so as to execute the processing in the chip 1 100b without dividing the image processing 2 (FIG. 6E).

The supplemental explanation has been given of the example in which control is performed so as to free the memory bandwidth of the chip 1 100b for improvement of the processing performance of the image processing 3. Here, for example, in a case where the memory bandwidth used for the image processing 3 is allocated to the chip 0 100a in S4 due to a change of the image processing setting or the like, control can also be performed so as to free the memory bandwidth of the chip 0 100a as much as possible. For improvement of the processing performance of an unshown CPU, it is possible to control a chip whose memory bandwidth is freed depending on a chip on which a CPU for executing specific processing is mounted. It is also possible to control the dividing position in S9 so as to equalize the free bandwidths of the respective chips.

Operation in Image Processing Apparatus

Figure 7:
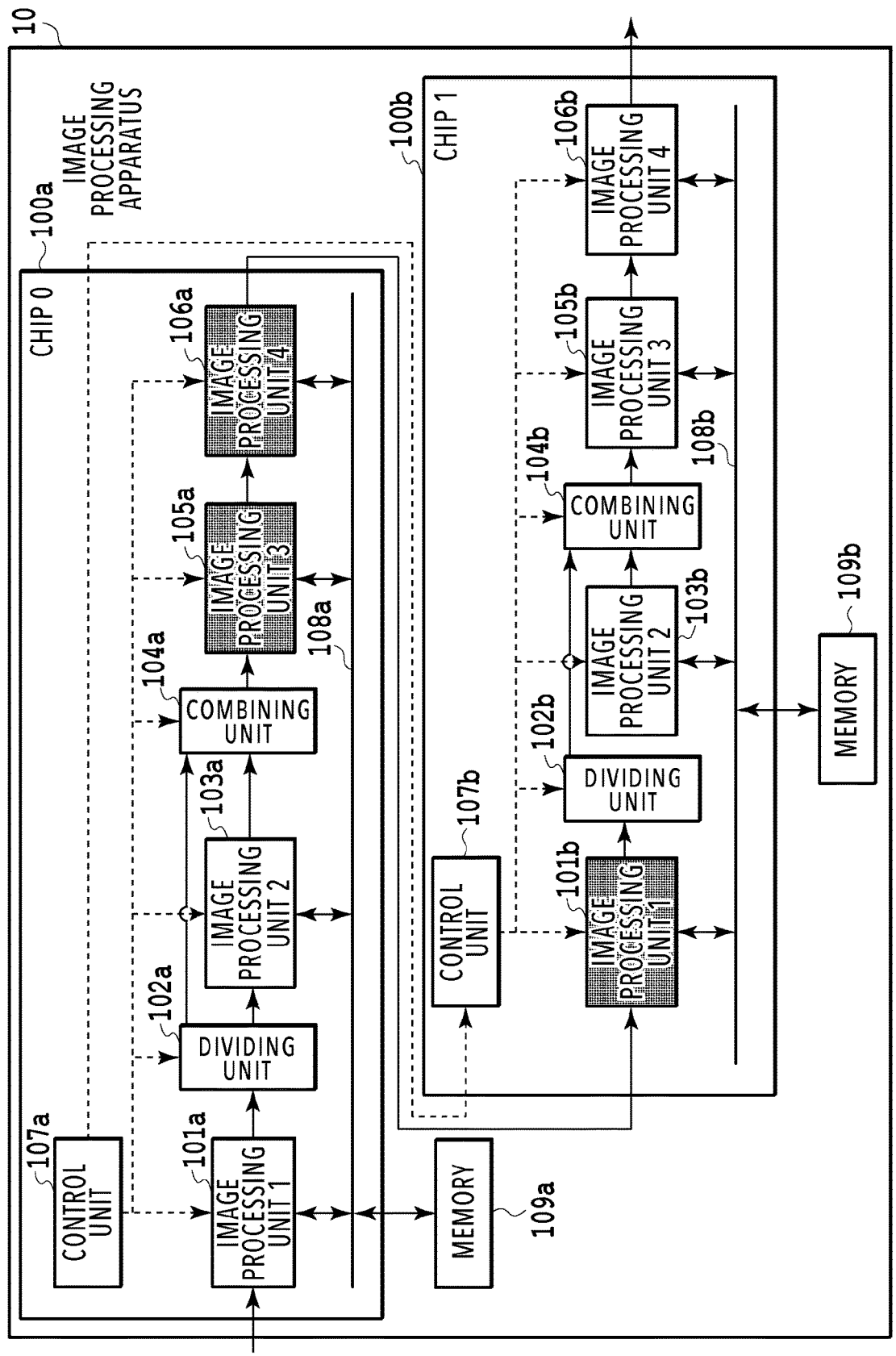
FIG. 7 is a diagram for explaining the operation of the image processing apparatus.

Next, the operation in the image processing apparatus will be described with reference to FIG. 7. After the input/output format and image processing mode are determined, the image processing apparatus 10 operates as described below based on the above-described control of the control unit 107 shown in FIG. 4A to FIG. 4C and FIG. 5. In FIG. 7, the shaded image processing unit 3 105a, image processing unit 4 106a, and image processing unit 1 101b operate in the second mode and do not execute image processing as a result of the above-described control.

An image input to the image processing apparatus 10 is input to the image processing unit 1 101a by an unshown input unit. The image processing unit 1 101a writes the input image to the memory 109a, reads the written image, executes predetermined processing, and outputs the processing result to the dividing unit 102a. The image processing 1 uses a memory bandwidth A out of the available memory bandwidth M of the memory 109a.

The dividing unit 102a divides the input image having a width W into a first region having a width Wa+Wover and a second region having a width Wb+Wover as shown in FIG. 4A to FIG. 4C according to an instruction from the control unit 107a. The dividing unit 102a outputs the image of the first region to the image processing unit 2 103*a* and outputs the image of the second region to the combining unit 104*a*.

The image processing unit 2 103*a* reads the image of the first region of the previous frame from the memory 109*a*, executes image processing, and writes the processing result to the memory 109*a*. The image processing unit 2 103*a* also reads the processing result from the memory 109*a*, executes predetermined processing, and outputs the processing result to the combining unit 104*a*.

In the image processing 2, processing is executed with reference to the inside of the frame also for Wover pixels located at the end of pixels to be processed. That is, since the same processing as that in the case of not dividing is executed for the divisional boundary, the overlap region Wover of the division boundary added by the dividing unit 102*a* is used as a reference image. Since the overlap region Wover is added as a reference region of the image processing 2, the overlap region Wover is processed as an unnecessary region after the completion of the image processing 2.

Since the image processing 2 is divided such that the memory bandwidth necessary for the image processing 1 and the image processing 2 is equal to the memory bandwidth of the memory 109*a* as described above, a memory bandwidth of the chip 0 100*a* used for the image processing 2 is M–A. In a case where a processing time necessary for the image processing 2 is defined as Tproc, the image processing unit 2 103*a* outputs the image processing result after the lapse of the Tproc time from input.

The combining unit 104*a* combines the processing result of the first region output from the image processing unit 2 103*a* with the image of the second region output from the dividing unit 102*a*. Since the width Wover in the boundary portion of the first region is unnecessary as described above, the first region is subjected to truncation processing of the overlap region Wover and then combined with the second region.

Figure 8A:
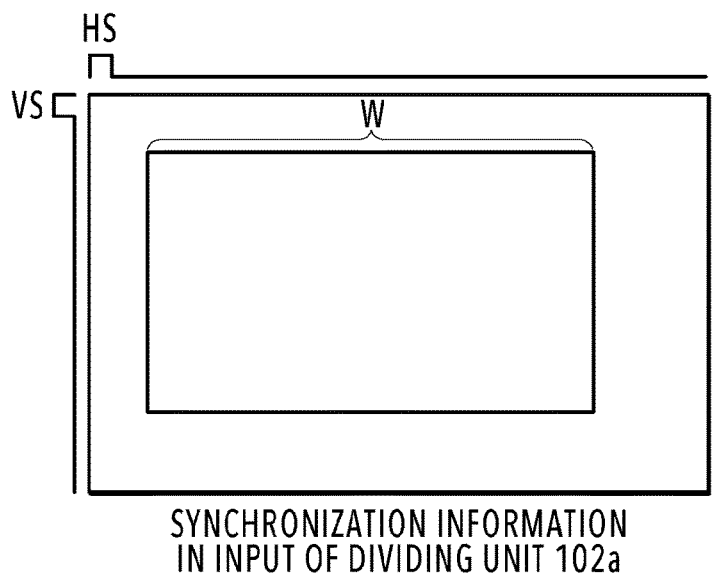
FIG. 8A is a diagram for explaining a processing delay in the case of dividing and executing processing.
Figure 8B:
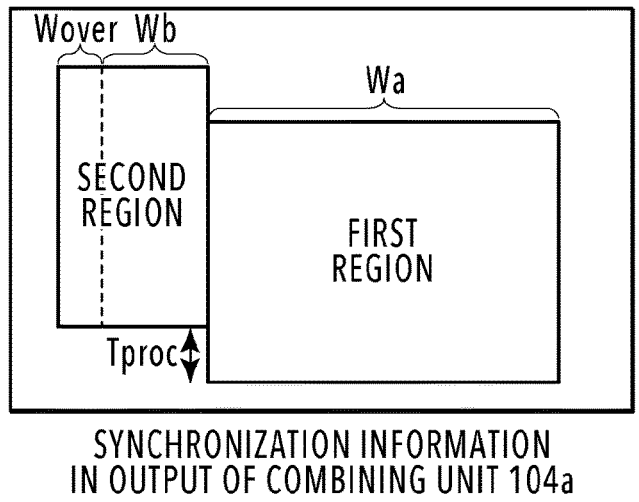
FIG. 8B is a diagram for explaining a processing delay in the case of dividing and executing processing.

In the combining processing, combination is performed in the order of the output of the dividing unit 102*a* and the output of the image processing 2 103*a*. As a result of the image processing 2, the image of the first region is input to the combining unit 104*a* later than the same line of the second region by the Tproc time. Thus, vertical coordinates are shifted as shown in FIG. 8B in an output combined image.

The image output from the combining unit 104*a* is input to the image processing unit 3 105*a* and the image processing unit 4 106*a* set in the second image processing mode and is output from an unshown output unit without the execution of the image processing 3 or the image processing 4. The output image is input to an unshown input unit of the chip 1 100*b*.

The image input to the chip 1 100*b* is input to the image processing unit 1 101*b* set in the second image processing mode and is output to the dividing unit 102*b* without the execution of the image processing 1. The dividing unit 102*b* divides the image into the first region of the width Wa and the second region of the width Wb+Wover based on an instruction from the control unit 107*b*, outputs the first region to the combining unit 104*b*, and outputs the second region to the image processing unit 2 103*b*.

The image processing unit 2 103*b* executes the same image processing as the image processing 2 in the image processing unit 2 103*a* for the second region and outputs the processing result to the combining unit 104*b*. In the second region, the overlap region Wover in the division boundary portion is processed as an unnecessary region. In the image processing unit 2 103*b*, the processing result is output after the lapse of the Tproc time like the image processing unit 2 103*a*.

The combining unit 104*b* combines the image of the first region output from the dividing unit 102*b* with an image obtained by removing the overlap region Wover from the processing result (image) of the second region output from the image processing unit 2 103*b*. At this time, the vertical shift (Tproc) between the first region and the second region at the stage of the dividing unit 102*b* is compensated for by executing the image processing 2 for the second region (that is, delaying the second region by the processing time of the image processing 2).

Figure 8C:
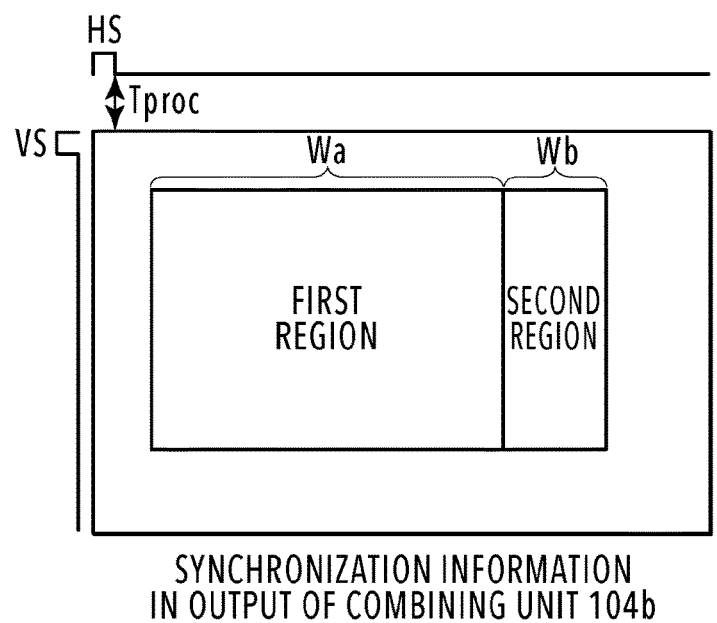
FIG. 8C is a diagram for explaining a processing delay in the case of dividing and executing processing.

Accordingly, the combining unit 104*b* combines the output results of the first region and second region as shown in FIG. 8C using an unshown line buffer provided therein and outputs the combination result to the image processing unit 3 105*b*. The processing result obtained at this time is the same as that in the case of executing the image processing 1 and 2 for the input image without division.

The image processing unit 3 105*b* reads the processing result of the input image of an unshown processing unit stored in the memory 109*b* and executes predetermined image processing for the input image. For example, it is assumed that the image processing unit 3 105*b* has the function of synthesizing graphics such as a user interface and an unshown different processing unit executes rendering processing of the graphics using the free bandwidth of the memory 109*b*. In this case, the image processing 2 is executed using the memory bandwidth of the memory 109*a* as much as possible and the memory bandwidth of the memory 109*b* is freed, thereby increasing the memory bandwidth available for the rendering processing. As a result, the rendering performance can be improved.

The image processing unit 3 105*b* outputs the processing result to the image processing unit 4 106*b*. The image processing unit 4 106*b* extracts data from the input image, writes the extracted data to the memory 109*b*, reads the data stored in the memory 109*b*, and executes predetermined image processing for the next frame. The image processing unit 4 106*b* outputs the processing result to an unshown display unit such as a liquid crystal panel, an unshown output unit, an unshown encoding unit or recording unit, or the like of the image processing apparatus 10, according to the form of the image processing apparatus.

As described above, according to the present embodiment, the memory bandwidths can be suitably controlled in image processing. In this regard, a supplemental explanation will be given based on the above description. First, it is assumed that the input image is equally divided into left and right images with overlap regions and then subjected to image processing. In this case, in execution of image dividing processing in each image processing, it is necessary to add the sum total of the overlap regions necessary for boundary processing in each image processing as a memory bandwidth. In this case, for example, if a reference region of transformation processing or the like is large, the overlap region to be added at the time of division also becomes large, which increases the necessary memory bandwidth. Therefore, the overlap region to be added becomes large, that is, the necessary memory bandwidth becomes large, as compared with the present embodiment in which the overlap region is added only in some division sections and dividing processing is executed.

In addition, in a case where chips are connected in series to configure the image processing apparatus without comprising the dividing unit 102 and the combining unit 104 unlike the present embodiment, the memory bandwidth necessary for the image processing 2 cannot be appropriately allocated as shown in FIG. 3A to FIG. 3C. Accordingly, it is necessary to reduce the image processing to be executed or increase the memory bandwidth using a higher speed memory.

However, the image quality deteriorates in the former case, that is, the case of reducing the image processing to be executed, and the manufacturing cost increases in the latter case, that is, the case of increasing the memory bandwidth using a higher speed memory. In contrast, in the image processing apparatus of the present embodiment, the collapse of the memory bandwidths is avoided by dividing the image into regions in some sections of the image processing and making the dividing position variable according to the status of use of the memory bandwidths. As a consequence, the deterioration of the image quality and the increase in cost can be avoided.

Second Embodiment

Figure 9:
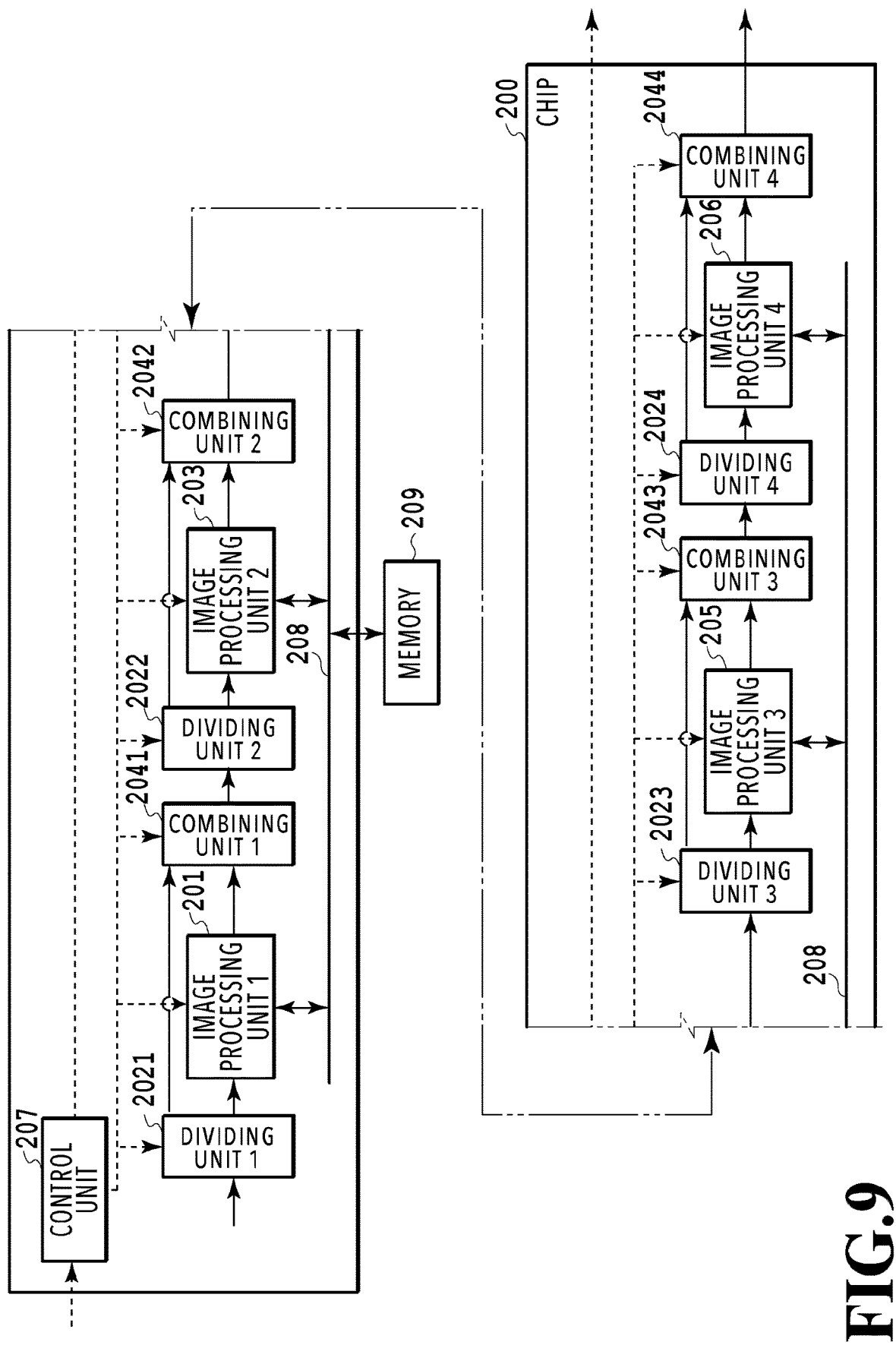
FIG. 9 is a block diagram showing the configuration of the image processing apparatus.

Next, the second embodiment will be described with reference to the block diagram of FIG. 9 showing the configuration of the image processing apparatus. In the first embodiment described above, the dividing unit 102 and the combining unit 104 are provided only before and after the image processing unit 2 103. In the second embodiment, in order to relax the restriction of the dividing position, the dividing unit is provided in the preceding stage and the combining unit is provided in the subsequent stage of each image processing unit.

A supplemental explanation will be given of memory bandwidths and their allocation with reference to FIG. 10A to FIG. 10C. It is assumed that the processing 1 does not access a memory 209 and the image processing 2, the image processing 3, and the image processing 4 access the memory 209. As shown in FIG. 10A to FIG. 10C, since the memory requested bandwidth D used for the image processing 4 exceeds the available memory bandwidth M of each memory, the restriction of the memory bandwidths cannot be satisfied unless the processing is divided and executed.

In the configuration of dividing only the image processing 2 like the first embodiment, the memory requested bandwidth cannot be satisfied and the processing mode of the image processing 4 needs to be changed to a mode that uses a less memory bandwidth. In contrast, in the present embodiment, the image processing 4 is divided. That is, in the present embodiment, as a result of the allocation in S4 of FIG. 2 described above, the image processing 2 and the image processing 3 are allocated to the memory of chip 0 as shown in FIG. 10B and the image processing 4 is specified as a target of division in S6.

In S7, the control unit 207 moves the processing to S8 since a dividing unit 2024 is provided in preceding stage and a combining unit 2044 is provided in the subsequent stage of an image processing unit 4 206 differently from the first embodiment.

In S8, the sum total of the free memory bandwidths of the memories 209 excluding a memory bandwidth necessary for the image processing 4 and a memory requested bandwidth used for processing in the case of dividing the image processing 4 are calculated. In FIG. 10A to FIG. 10C, it is determined that the free memory bandwidth is greater than the memory requested bandwidth at the time of division of the image processing 4. In S9, the dividing position of the image in the image processing 4 is determined. Since the processing of determining the dividing position in S9 is the same as that in the first embodiment described above, the description thereof is omitted.

As a result of determining the dividing position in S9, the memory bandwidth necessary for the image processing in each chip is as shown in FIG. 10C. The memory requested bandwidth of the image processing in each chip is less than the available memory bandwidth M of each memory. Therefore, the control unit 207 finishes the processing shown in FIG. 2.

As described above, the memory bandwidths can be controlled more flexibly by comprising the dividing unit in the preceding stage and the combining unit in the subsequent stage of each image processing unit that accesses the memory.

If the circuit scale is increased by comprising the dividing unit and the combining unit, it is only necessary to provide neither the dividing unit nor the combining unit in image processing (image processing unit) that cannot be a division boundary of processing in the system. For example, in a case where the maximum memory requested bandwidth of the image processing 1 is equal to or less than the available memory bandwidth M, even if the dividing unit and the combining unit are provided before and after the image processing 1, the units will not be used. In this case, it is preferable to insert neither the dividing unit nor the combining unit.

Although the configuration of connecting two chips in series has been described, the above-described dividing processing and combining processing can be executed also in the case of connecting more chips in series and executing image processing across some chips depending on the status of the free memory bandwidth.

Third Embodiment

In the embodiments described above, a plurality of identical chips are connected in series. In the present embodiment, memory bandwidths of chips can be suitably controlled in a case where different types of image processing are executed in two chips connected in series but some image processing units (image processing circuits) are mounted on both of the chips. That is, even in a case where two chips have different configurations, the memory bandwidths of the chips can be suitably controlled by applying dividing processing to image processing in the common image processing units in the two chips like the first embodiment described above.

Figure 11:
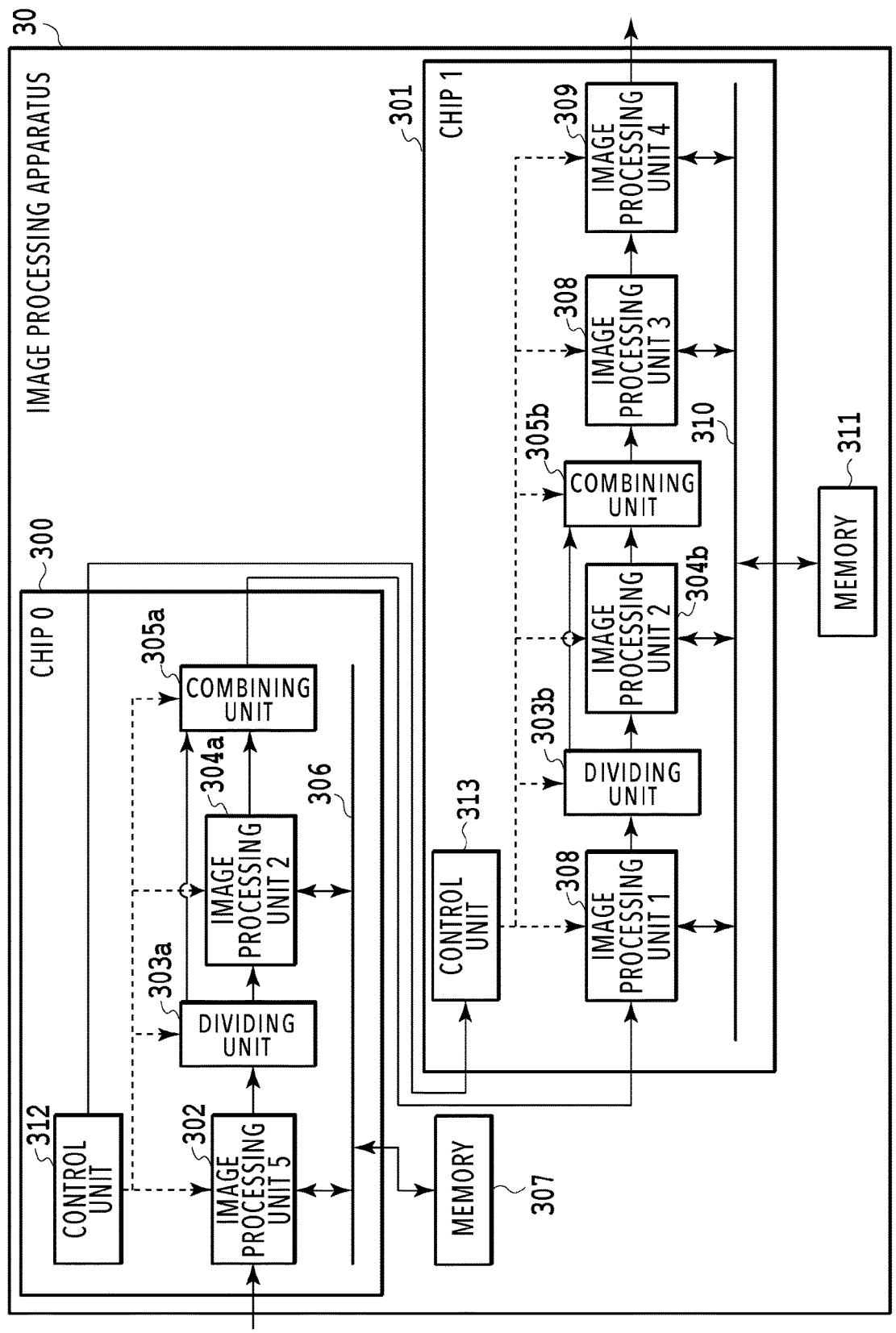
FIG. 11 is a block diagram showing the configuration of the image processing apparatus.

FIG. 11 is a block diagram showing the configuration of an image processing apparatus 30. The image processing apparatus 30 is configured by connecting a chip 0 300 and a chip 1 301 in series. Each of the chip 0 300 and the chip 1 301 comprises an image processing unit (image processing unit 2 304) having the same configuration and comprises a dividing unit 303 in the preceding stage and a combining unit 305 in the subsequent stage of the image processing unit 2 304.

In the configuration of the image processing apparatus 30, the image processing unit 2 and the image processing unit 5 of the chip 0 300 are connected to a memory 307 via a bus 306. Similarly, in the chip 1 301, each of the image processing units 1 to 4 is connected to a memory 311 via a bus 310. A control unit 312 of the chip 0 300 is connected to each processing unit of the chip 0 300 and comprises a communication interface (communication path) with a control unit 313 of the chip 1 301. Similarly, the control unit 313 of the chip 1 301 is connected to each processing unit of the chip 1 301 and connected to the control unit 312 of the chip 0 300 via the interface.

The configuration shown in FIG. 11 is based on the assumption that, for example, the chip 1 301 is developed first and the chip 0 300 is then mounted on an FPGA or the like in order to update image processing 1 308 to image processing 5 302, thereby configuring the image processing apparatus 30. "FPGA" stands for a field-programmable gate array. It is also possible to mount a new LSI instead of the FPGA.

Processing in the control unit 312 of the image processing apparatus 30 of the present embodiment will be described with reference to the flowchart of FIG. 2 described above. The description of the same processing as the embodiments described above will be omitted.

Figure 12A:
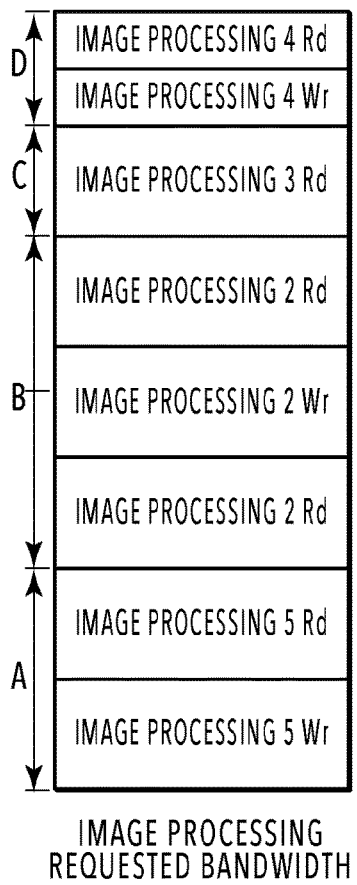
FIG. 12A is a diagram for explaining the allocation of memory bandwidths.
Figure 12B:
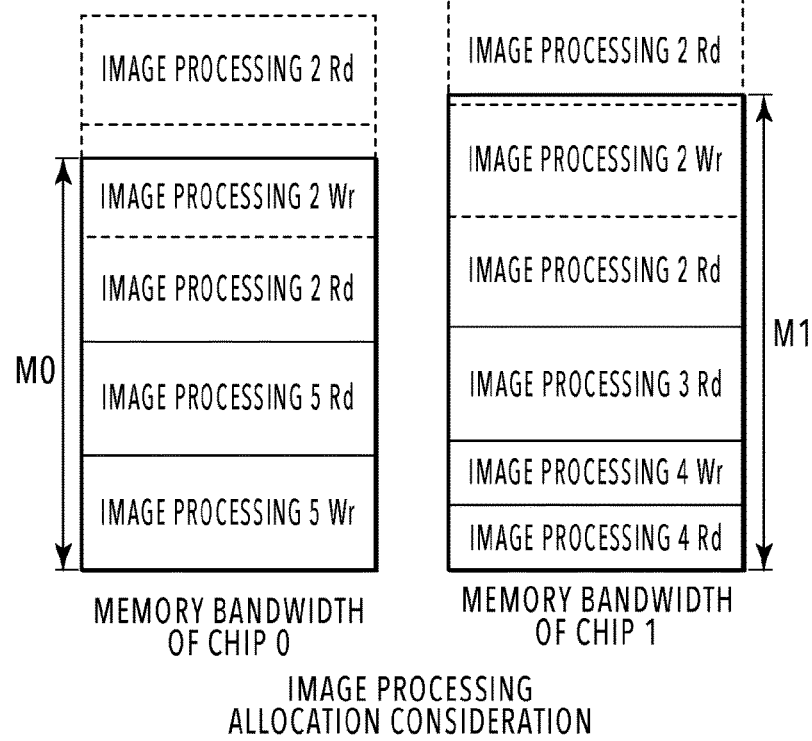
FIG. 12B is a diagram for explaining the allocation of memory bandwidths.
Figure 12C:
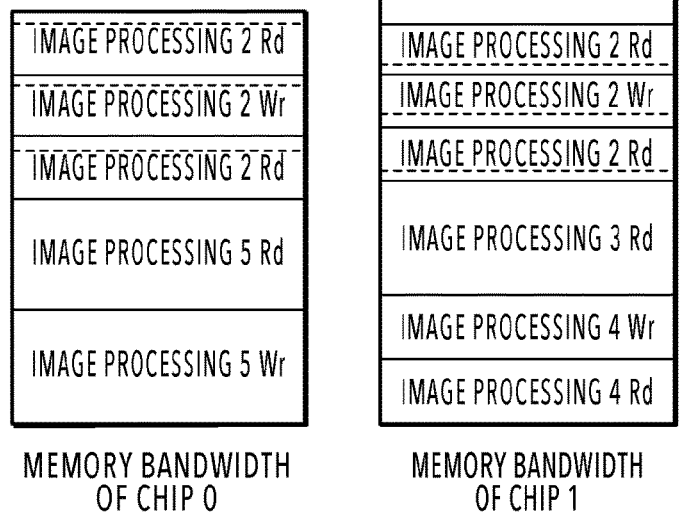
FIG. 12C is a diagram for explaining the allocation of memory bandwidths.

In S3, memory bandwidths necessary for the image processing 2 to 5 are calculated. FIG. 12A to FIG. 12C (FIG. 12A) show a memory requested bandwidth of each image processing of the image processing apparatus 30. In the present embodiment, since the image processing unit 1 308 is not used, a memory requested bandwidth of the image processing 1 is 0.

In S4, the control unit 312 allocates the execution of each of the image processing 2 to 5 to either of the chips. It is assumed that an available memory bandwidth of the memory 307 is M0 and an available memory bandwidth of the memory 311 is M1, that is, these memories have different bandwidths.

As shown in FIG. 12B, the control unit 312 allocates the memory bandwidth used for the image processing 5 to the memory of the chip 0 300 and allocates the memory bandwidths used for the image processing 3 and 4 to the memory of the chip 1 301. The memory bandwidth used for the image processing 2 cannot be allocated to either of the chips without division. Thus, in S5, a free memory bandwidth of each memory excluding the memory bandwidth necessary for the image processing 2 is calculated. After that, in S6, the image processing 2 is specified as a target of dividing processing.

In S7, since the dividing unit 303 is provided in the preceding stage and the combining unit 305 is provided in the subsequent stage of the image processing unit 2 in both of the chip 0 300 and the chip 1 301, the control unit 312 determines that the image processing 2 can be divided. In S8, the control unit 312 determines whether the sum total of the free memory bandwidths of the memories calculated in S5 is equal to or greater than a memory requested bandwidth used for processing in the case of dividing the image processing 2 specified in S6. Here, the control unit 312 determines that the memory requested bandwidth used for processing in the case of dividing the image processing 2 is smaller than the sum total of the free memory bandwidths of the memories and moves the processing to S9.

In S9, the control unit 107*a* determines the dividing position of the image processing 2 so as to make full use of the memory bandwidth of the memory 307. The determination of the dividing position is the same as that in the first embodiment described above, except that the memories have the same memory bandwidth in the first embodiment described above, whereas the memories have different memory bandwidths and the difference is taken into consideration in the present embodiment. As a result of executing the processing of S9, as shown in FIG. 12C, the free memory bandwidth of the memory 307 is 0 and the free memory bandwidth of the memory 311 is M1−(A+B+C+D−M0).

In S10, the control unit 312 determines whether the memory bandwidth of each chip will collapse. As a result of determination, since the memory bandwidth in use of each chip is less than the available memory bandwidth as shown in FIG. 12C, the processing shown in FIG. 2 is finished.

As described above, even in the configuration of connecting different types of chips in series, the memory bandwidths can be suitably controlled by comprising the identical image processing unit and the dividing unit and combining unit in the preceding and subsequent stages thereof.

Fourth Embodiment

Figure 13:
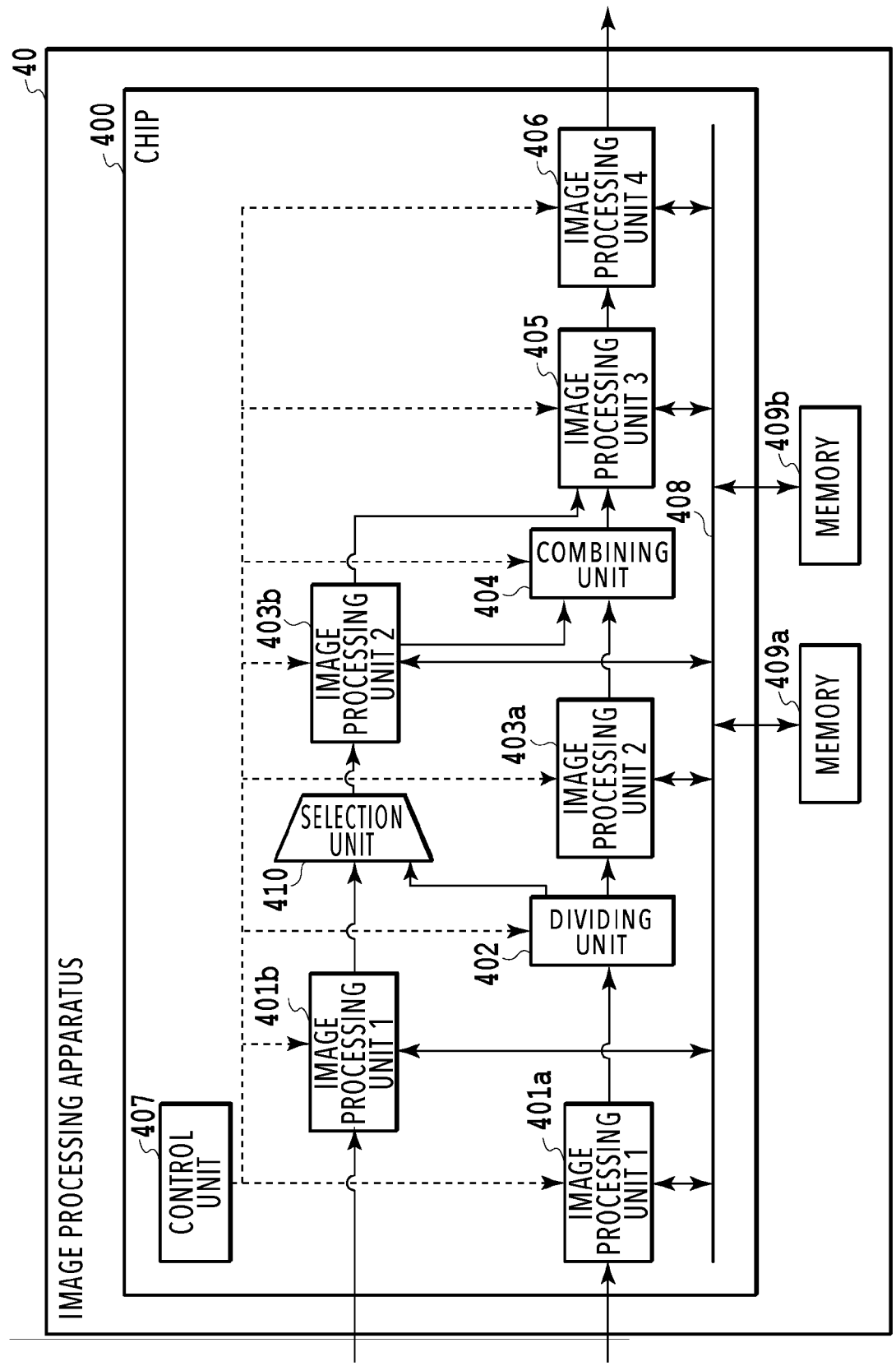
FIG. 13 is a block diagram showing the configuration of the image processing apparatus.

Next, the fourth embodiment will be described with reference to the block diagram of FIG. 13 showing the configuration of an image processing apparatus. An image processing apparatus 40 has the two functions, the function of processing one input and the function of synthesizing two inputs into one screen, and switches the processing according to an instruction from a control unit 407.

A chip 400 configuring the image processing apparatus 40 comprises an image processing unit 1 401, an image processing unit 2 403, an image processing unit 3 405, and an image processing unit 4 406, each of which accesses a memory 409 at the time of image processing. The memory 409 (a memory 409*a* or a memory 409*b*) to be accessed is switched according to address setting of each image processing.

Each of the image processing 1 401 and the image processing 2 403 comprises two identical image processing circuits (that is, the image processing 1 401 comprises image processing 1 401*a* and image processing 1 401*b* and the image processing 2 403 comprises image processing 2 403*a* and image processing 2 403*b*). Further, the image processing 2 403*a* comprises a dividing unit 402 in the preceding stage of the image processing 2 403*a* and a combining unit 404 in the subsequent stage of the image processing 2 403*a*. The image processing apparatus 40 also comprises a selection unit 410 to select either one of the outputs of the image processing unit 1 401*b* and the dividing unit 402 and output it to the image processing unit 2 403*b*.

Figure 14A:
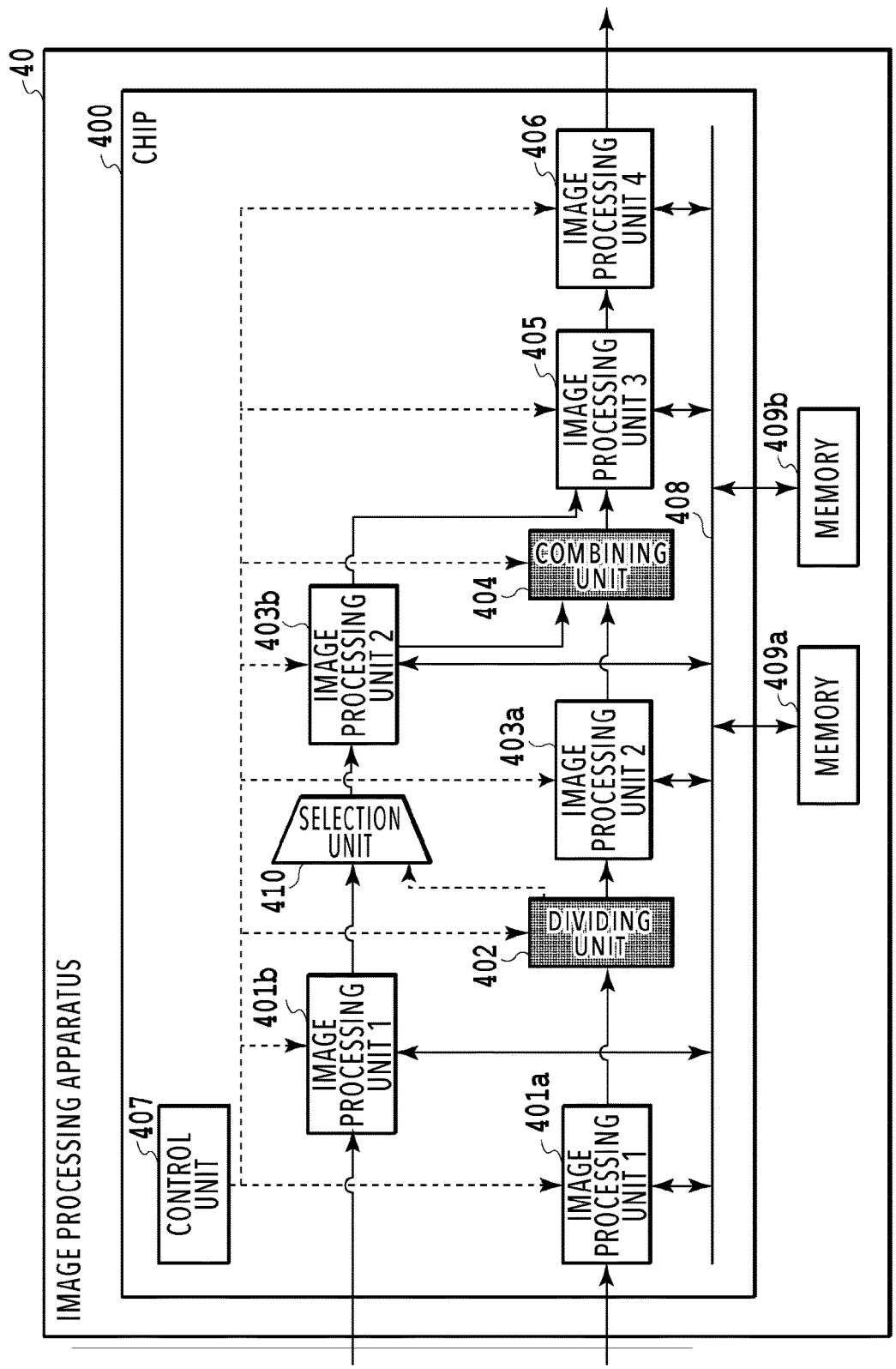
FIG. 14A is a diagram for explaining the operation of the image processing apparatus.

First, processing of synthesizing and displaying two screens will be described with reference to FIG. 14A. In the following description, two inputs will be referred to as an input A and an input B. The input A is input from an unshown input unit to the image processing unit 1 401*a*, subjected to the image processing 1, and then output to the dividing unit 402. The dividing unit 402 outputs the input A subjected to the image processing 1 to the image processing unit 2 403*a* without executing dividing processing.

The image processing unit 2 403*a* executes the image processing 2 for the input A subjected to the image processing 1 and outputs the execution result to the combining unit 404. The combining unit 404 outputs the input A subjected to the image processing 1 and the image processing 2 to the image processing 3 405 without executing combining processing.

Next, the input B is input from an unshown input unit to the image processing unit 1 401*b*, subjected to the image processing 1, and then output to the selection unit 410. The selection unit 410 operates so as to select the output from the image processing unit 1 401*b* and outputs the input B subjected to the image processing 1 to the image processing 2 403*b*. The image processing 2 403*b* executes the image processing 2 for the input B subjected to the image processing 1 and outputs the execution result to the image processing 3 405.

Next, the image processing unit 3 405 writes each of the input A subjected to the image processing 1 and the image processing 2 and the input B subjected to the image processing 1 and the image processing 2 to the memory 409. After that, while laying out each input image in a predetermined position, the image processing unit 3 405 reads the input A, the input B, and graphics from the memory 409, synthesizes them, and outputs the result to the image processing 4 406. The image processing unit 4 406 executes the image processing 4 for the result of the synthesis processing and outputs the execution result.

Figures 15A, 15B:
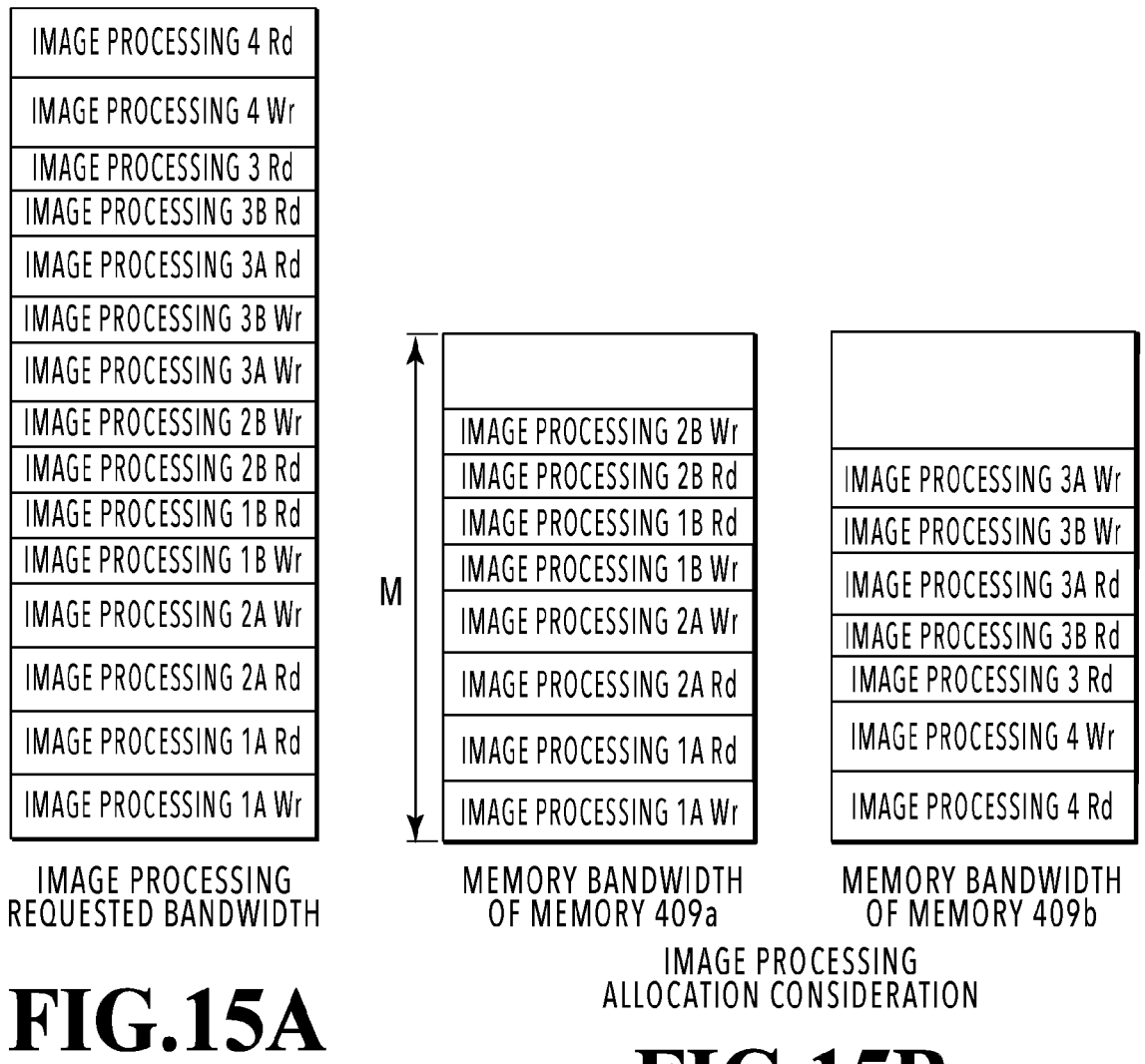
FIG. 15A is a diagram for explaining the allocation of memory bandwidths.
FIG. 15B is a diagram for explaining the allocation of memory bandwidths.

A supplemental explanation will be given of the memories 409 and a memory requested bandwidth of each image processing of the image processing apparatus 40 with reference to FIG. 15A and FIG. 15B. FIG. 15A shows a memory requested bandwidth of each image processing of the image processing apparatus 40. As shown in FIG. 15B, regarding memory access in each image processing, the memory bandwidths will not collapse if the memory bandwidths used for the image processing 1 and the image processing 2 are allocated to the memory 409*a* and the memory bandwidths used for the image processing 3 and the image processing 4 are allocated to the memory 409*b*.

Figure 14B:
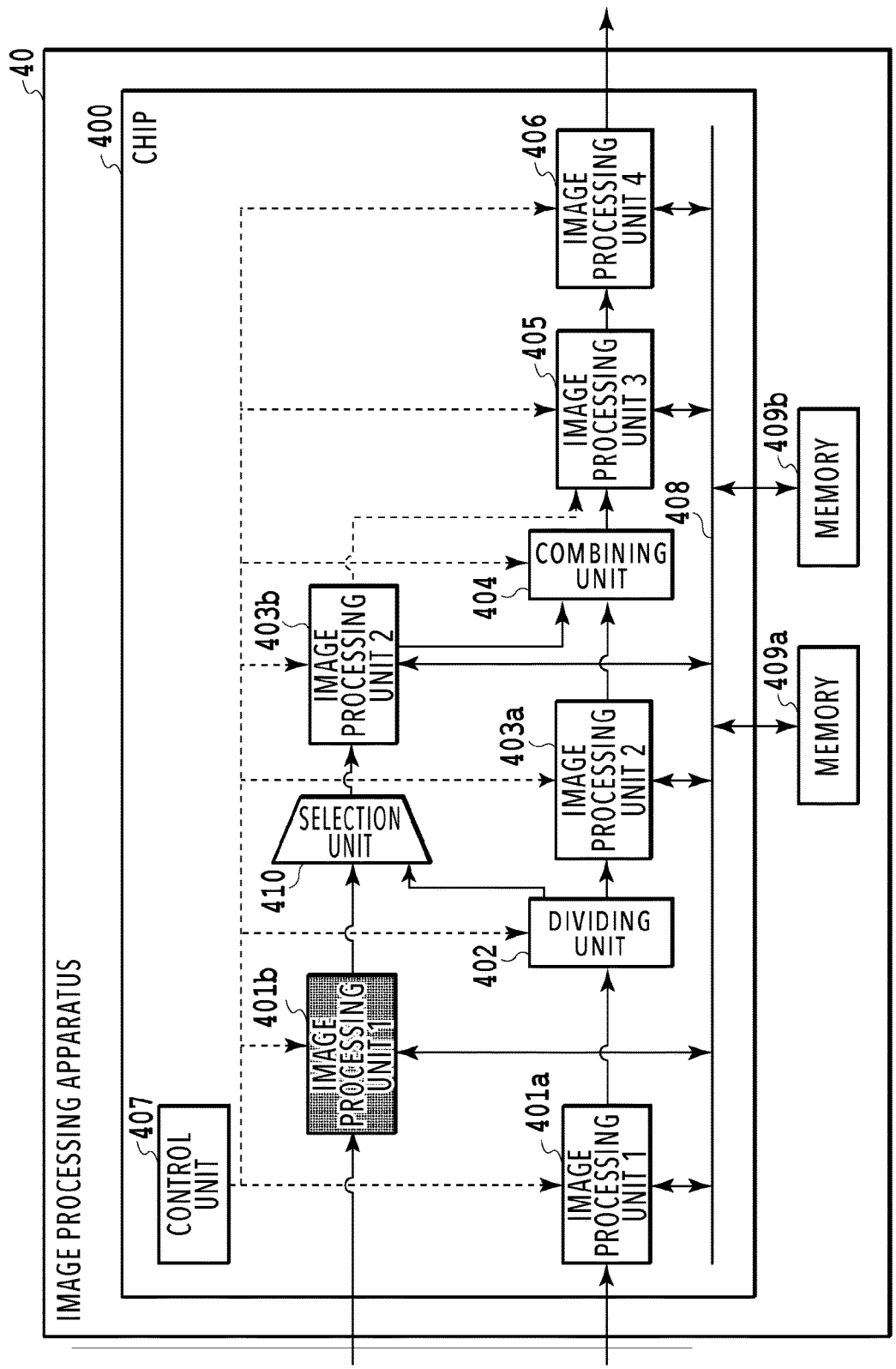
FIG. 14B is a diagram for explaining the operation of the image processing apparatus.

Next, processing regarding one input will be described with reference to FIG. 14B. An image input from an unshown input unit (hereinafter also referred to as an input image) is subjected to the image processing 1 in the image processing unit 1 401*a* and the execution result is output to the dividing unit 402.

The dividing unit 402 divides the input image subjected to the image processing 1 into a first region and a second region according to determination processing of the control unit 407 to be described later. The divided first region is output to the image processing unit 2 403*a* and the divided second region is output to the selection unit 410. The selection unit 410 selects an output other than the output from the image processing unit 1 401*b*, that is, the output from the dividing unit 402 (namely, the second region) and outputs it to the image processing unit 2 403*a*.

The control unit 407 sets the same operation mode for the image processing units 2 403 (that is, the image processing unit 2 403*a* and the image processing unit 2 403*a*). The image processing unit 2 executes predetermined image processing for the image of the divided first region and outputs the execution result to the combining unit 404. Here, control is performed such that the image processing unit 2 403*a* uses the memory 409*a* and the image processing unit 2 403*b* uses the memory 409*b*.

The combining unit 404 combines the first region and second region divided in the dividing unit 402 and outputs the combination result to the image processing unit 3 405. The image processing unit 3 405 reads graphics from the memory 409*b*, synthesizes them and the image combined by the combining unit 404, and outputs the synthesis result to the image processing unit 4 406. The graphic data to be synthesized is generated by an unshown rendering unit and the rendering processing is executed using the free memory bandwidth of the memory 409*b*. The image processing unit 4 406 executes predetermined image processing using the memory 409*b* and outputs the execution result.

Processing in the control unit 407 of the image processing apparatus 40 of the present embodiment will be described with reference to the flowchart of FIG. 2 described above. The present embodiment is different from the first embodiment in that memories are mounted on different chips in the first embodiment described above, whereas two memories are mounted on the same chip and the memory bandwidths are allocated to the two memories in the present embodiment.

After the input format and the image processing mode are determined (S1 and S2), the control unit 407 determines in S3 the memory requested bandwidths of the image processing 1 to 4. FIG. 16A to FIG. 16E (FIG. 16A) show the memory requested bandwidth of each image processing of the image processing apparatus 40. Since FIG. 16B and FIG. 16C are the same as FIG. 3A to FIG. 3C in the first embodiment described above, the description thereof is omitted.

In S4, the control unit 407 allocates the execution of the image processing 1 to 4 to either the memory 409*a* or the memory 409*b*. In the present embodiment, since each image processing is executed in the same chip, there is no need for allocation considering the order of image processing unlike the first embodiment. However, the free memory bandwidth allocated to the image processing 3 is maximized as much as possible in order to maximize the processing performance of the image processing 3. In this case, for example, it is assumed that the image processing 1 is allocated to the memory 409*a* as shown in FIG. 16B or the image processing 1 and the image processing 4 are allocated to the memory 409*a* as shown in FIG. 16D.

In S5, the free memory bandwidth of the memory 409 is calculated. In S6, the image processing 2 is specified as a target of dividing processing. In the case of selecting the allocation shown in FIG. 16D, the processing can be executed while satisfying the restriction of the memory bandwidths by allocating the image processing 2 to the memory 409*b*. However, dividing processing of the image processing 2 is considered in order to free the bandwidth of the memory 409*b* as much as possible.

In S7, since the dividing unit 402 is mounted in the preceding stage and the combining unit 404 is mounted in the subsequent stage of the image processing unit 2 403, it is determined that processing in the image processing 2 can be divided. Next, in S8 and S9, according to the procedure of processing described above, the dividing position of the image to be processed in the image processing unit 2 403 is specified and the dividing position Wa and the overlap region Wover are determined as shown in FIG. 16C and FIG. 16E. As a result, in S10, it is determined that each memory bandwidth will not collapse and the determination processing is finished.

As described above, the memory bandwidths can be suitably controlled by allocating the memory bandwidths used for image processing according to the status of use of the memories not only in the configuration of connecting a plurality of chips in series but also in the configuration of comprising a plurality of identical image processing units in a chip.

OTHER EMBODIMENTS

In the embodiments described above, the image processing units 1 to 4 execute different types of processing concerning memory access. However, the units may execute the same processing.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the technique of this disclosure, memory bandwidths can be suitably controlled in image processing.

This application claims the benefit of Japanese Patent Application No. 2019-148817 filed Aug. 14, 2019, which is hereby incorporated by reference wherein in its entirety.

What is claimed is:

1. An image processing apparatus comprising:
a plurality of image processing units configured to apply image processing according to the image processing units;
a plurality of storage units used in the image processing;
a control unit configured to control image processing;
at least two dividing units configured to divide image data according to an instruction from the control unit; and
at least two combining units configured to combine image data according to an instruction from the control unit,
wherein the control unit specifies image processing for which image data is divided by each of the at least two dividing units according to information about a status of use of the storage units,
the control unit determines a dividing position in which image data to be processed in the specified image processing is divided by each of the at least two dividing units, on a condition that the image processing units include at least two image processing units that apply the specified image processing and the at least two image processing units are connected to different ones of the storage units,
the control unit performs control such that one of the at least two image processing units applies image processing to one of at least two parts of image data divided by one of the at least two dividing units based on the dividing position, and one of the at least two combining units combines the one of the at least two parts of image data subjected to the image processing by the one of the at least two image processing units with a different at least one of the at least two parts of image data, and the control unit performs control such that a different at least one of the at least two image processing units applies image processing to the different at least one of at least two parts of image data obtained by a different at least one of the at least two dividing units dividing the combined image data based on the dividing position, the different at least one of the at least two parts of image data being not subjected to the image processing by the one of the at least two image processing units, and a different at least one of the at least two combining units combines the different at least one of the at least two parts of image data subjected to the image processing by the different at least one of the at least two image processing units with the one of the at least two parts of image data.

2. The image processing apparatus according to claim 1, wherein the control unit controls the image processing apparatus in a first image processing mode and a second image processing mode,
in the first image processing mode, the control unit performs control such that the image processing units apply image processing for one of at least two parts of image data divided by each of the at least two dividing units based on the dividing position, and each of the at least two combining units combines the one of the at least two parts of image data subjected to the image processing with a different at least one of the at least two parts of image data, and
in the second image processing mode, the control unit performs control such that the image processing units do not execute image processing.

3. The image processing apparatus according to claim 1, wherein the control unit determines a dividing position in which image data to be processed in the specified image processing is divided by each of the at least two dividing units, on a condition that each of the at least two dividing units is provided in a preceding stage and each of the at least two combining units is provided in a subsequent stage of each of the image processing units which apply the specified image processing.

4. The image processing apparatus according to claim 1, wherein the information about the status of use of the storage units includes information about a frame rate in the image processing units and information about a data amount concerning writing to the storage units and reading from the storage units according to settings of the image processing units.

5. The image processing apparatus according to claim 1, wherein at a time of division of the image data, each of the at least two dividing units adds a set of pixels located around pixels to be processed by the image processing units to a division boundary portion as a reference region.

6. The image processing apparatus according to claim 1, wherein image processing according to the image processing units is continuously executed in a predetermined order.

7. The image processing apparatus according to claim 6, wherein in each of the image processing, the control unit specifies image processing for which image data is divided by each of the at least two dividing units by allocating space used for the image processing to any one of the storage units based on at least free space of the storage units and processing contents of image processing according to the image processing units, and
the control unit determines the dividing position by controlling a ratio of division of image data to be processed in the specified image processing.

8. The image processing apparatus according to claim 1, wherein
the image processing units are mounted on a plurality of chips, and
the chips are connected in series such that an output of a preceding chip is connected to an input of a subsequent chip.

9. The image processing apparatus according to claim 8, wherein
the control unit includes a plurality of control parts which are connected to each other via a predetermined communication path,
the control parts are respectively mounted on the chips,
one of the control parts determines the dividing position and an image processing mode in each of the image processing units,
the one of control parts notifies a different one of the control parts of the determined dividing position and image processing mode via the predetermined communication path, and
the different one of the control parts controls one of the chips corresponding to the different one of the control parts based on the notified dividing position and image processing mode.

10. The image processing apparatus according to claim 1, wherein
the image processing units are mounted on a single chip,
the image processing apparatus further comprises a selection unit configured to select either one of an output of one of the at least two dividing units and an output different from the output of the one of the at least two dividing units, and
the selection unit selects and outputs an input from the one of the at least two dividing units in a case where the one of the at least two dividing units executes dividing processing, and selects and outputs a different input in a case where the one of the at least two dividing units does not execute dividing processing.

11. The image processing apparatus according to claim 1, wherein the different at least one of the at least two image processing units is more than one image processing unit.

12. An image processing method in an image processing apparatus comprising a plurality of image processing units which apply image processing according to the image processing units, a plurality of storage units which store image data and data used for image processing, a control unit which controls image processing, at least two dividing units which divide image data according to an instruction from the control unit, and at least two combining units which combine image data,
the image processing method comprising:
a specifying step of specifying, by the control unit, image processing for which image data is divided by each of the at least two dividing units according to information about a status of use of the storage units;
a determination step of determining, by the control unit, a dividing position in which image data to be processed in the specified image processing is divided by each of the at least two dividing units, on a condition that the image processing units include at least two image processing units that apply the specified image processing and the at least two image processing units are connected to different ones of the storage units;
a first control step of performing, by the control unit, control such that one of the at least two image processing units applies image processing to one of at least two parts of image data divided by one of the at least two dividing units based on the dividing position, and one of the at least two combining units combines the one of the at least two parts of image data subjected to the image processing by the one of the at least two image processing units with a different at least one of the at least two parts of image data; and
a second control step of performing, by the control unit, control such that a different at least one of the at least two image processing units applies image processing to the different at least one of at least two parts of image data obtained by a different at least one of the at least two dividing units dividing the combined image data based on the dividing position, the different at least one of the at least two parts of image data being not subjected to the image processing by the one of the at least two image processing units, and a different at least one of the at least two combining units combines the different at least one of the at least two parts of image data subjected to the image processing by the different at least one of the at least two image processing units with the one of the at least two parts of image data.

13. The image processing method according to claim 12, wherein in the control unit,
the image processing apparatus is controlled in a first image processing mode and a second image processing mode,
in the first image processing mode, control is performed such that the image processing units apply image processing for one of at least two parts of image data divided by each of the at least two dividing units based on the dividing position, and each of the at least two combining units combines the one of the at least two parts of image data subjected to the image processing with a different at least one of the at least two parts of image data, and
in the second image processing mode, control is performed such that the image processing units do not execute image processing.

14. The image processing method according to claim 12, wherein in the control unit, a dividing position in which image data to be processed in the specified image processing is divided by each of the at least two dividing units is determined on a condition that each of the at least two dividing units is provided in a preceding stage and each of the at least two combining units is provided in a subsequent stage of each of the image processing units which apply the specified image processing.

15. The image processing method according to claim 12, wherein the information about the status of use of the storage units includes information about a frame rate in the image processing units and information about a data amount concerning writing to the storage units and reading from the storage units according to settings of the image processing units.

16. The image processing method according to claim 12, wherein at a time of division of the image data, each of the at least two dividing units adds a set of pixels located around pixels to be processed by the image processing units to a division boundary portion as a reference region.

17. The image processing method according to claim 12, wherein image processing according to the image processing units is continuously executed in a predetermined order.

18. The image processing method according to claim 17, wherein in the control unit, image processing for which image data is divided by each of the at least two dividing units is specified in each of the image processing by allocating space used for the image processing to any one of the storage units based on at least free space of the storage units and processing contents of image processing according to the image processing units, and the dividing position is determined by controlling a ratio of division of image data to be processed in the specified image processing.

19. The image processing method according to claim 12, wherein the image processing units are mounted on a plurality of chips, and the chips are connected in series such that an output of a preceding chip is connected to an input of a subsequent chip.

20. A non-transitory computer readable storage medium storing a program for executing each step of an image processing method in an image processing apparatus comprising a plurality of image processing units which apply image processing according to the image processing units, a plurality of storage units which store image data and data used for image processing, a control unit which controls image processing, at least two dividing units which divide image data according to an instruction from the control unit, and at least two combining units which combine image data, the image processing method comprising:

a specifying step of specifying, by the control unit, image processing for which image data is divided by each of the at least two dividing units according to information about a status of use of the storage units;

a determination step of determining, by the control unit, a dividing position in which image data to be processed in the specified image processing is divided by each of the at least two dividing units, on a condition that the image processing units include at least two image processing units that apply the specified image processing and the at least two image processing units are connected to different ones of the storage units;

a first control step of performing, by the control unit, control such that one of the at least two image processing units applies image processing to one of at least two parts of image data divided by one of the at least two dividing units based on the dividing position, and one of the at least two combining units combines the one of the at least two parts of image data subjected to the image processing by the one of the at least two image processing units with a different at least one of the at least two parts of image data; and a second control step of performing, by the control unit, control such that a different at least one of the at least two image processing units applies image processing to the different at least one of at least two parts of image data obtained by a different at least one of the at least two dividing units dividing the combined image data based on the dividing position, the different at least one of the at least two parts of image data being not subjected to the image processing by the one of the at least two image processing units, and a different at least one of the at least two combining units combines the different at least one of the at least two parts of image data subjected to the image processing by the different at least one of the at least two image processing units with the one of the at least two parts of image data.

* * * * *